US010296683B2

(12) United States Patent
Cipolla

(10) Patent No.: US 10,296,683 B2
(45) Date of Patent: May 21, 2019

(54) COMPUTER IMPLEMENTED APPARATUS AND METHOD FOR FINITE ELEMENT MODELING USING HYBRID ABSORBING ELEMENT

(71) Applicant: Thornton Tomasetti, Inc., New York, NY (US)

(72) Inventor: Jeffrey Cipolla, Washington, DC (US)

(73) Assignee: THORNTON TOMASETTI, INC., New York, NY (US)

( * ) Notice: Subject to any disclaimer, the term of this patent is extended or adjusted under 35 U.S.C. 154(b) by 1206 days.

(21) Appl. No.: 14/535,155

(22) Filed: Nov. 6, 2014

(65) Prior Publication Data

US 2015/0127311 A1 May 7, 2015

Related U.S. Application Data

(60) Provisional application No. 61/900,864, filed on Nov. 6, 2013.

(51) Int. Cl.
G06F 17/50 (2006.01)

(52) U.S. Cl.
CPC ...... *G06F 17/5018* (2013.01); *G06F 2217/16* (2013.01)

(58) Field of Classification Search
None
See application file for complete search history.

(56) References Cited

U.S. PATENT DOCUMENTS

| 5,265,040 | A | * | 11/1993 | Saji | ......... G06F 17/13 345/441 |
| 2007/0043543 | A1 | * | 2/2007 | Wandzura | ........... G06F 17/5018 703/2 |

* cited by examiner

*Primary Examiner* — Syed A Roni
(74) *Attorney, Agent, or Firm* — Arent Fox LLP

(57) ABSTRACT

An apparatus and method use a hybrid absorbing element defined by a implementation of matched layer and infinite element concepts to model time-domain and frequency domain wave propagation finite element calculations. The hybrid absorbing element includes three or more semi-infinite facets providing an essentially reflectionless interface for outgoing waves. Matched layer conditions are coupled to finite-element wavefield computation regions and infinite element conditions, which effectively disperse advancing waves at infinity. The disclosed apparatus and method result in the rapid attenuation of waves arriving at arbitrary angles, leading to elimination of reflection artifacts.

7 Claims, 17 Drawing Sheets

COMPUTER IMPLEMENTED APPARATUS AND METHOD FOR FINITE ELEMENT MODELING USING HYBRID ABSORBING ELEMENT

CROSS-REFERENCE TO RELATED APPLICATIONS

This application claims the benefit of U.S. Provisional Application No. 61/900,864, filed Nov. 6, 2013.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

INCORPORATION-BY-REFERENCE OF MATERIAL SUBMITTED ON A COMPACT DISC

Not Applicable.

TECHNICAL FIELD

The invention relates to modeling wave propagation. More particularly, the invention relates to an apparatus and method for modeling wave propagation in acoustic, elastic and electromagnetic problems in both frequency- and time-domains.

BACKGROUND

In many of the predictive and analytical problems of theoretical and applied engineering, it is necessary to solve one or more of the equations of physics that describe a physical field. The analyst will target the solution of one or more field variables, for example, mechanical deformation, acoustic pressure, electrostatic or electromagnetic potential, or electromagnetic field intensity, among others.

The equations that govern these and other fields are differential equations, integral equations, or equations that combine aspects of both, which can be solved exactly, if at all, only for specific, simple cases. Boundary conditions (and initial conditions, if time evolution is part of the inquiry) complete the definition of the problem. In practical situations, these boundary conditions often involve specifying the field variable, its derivatives, functions of either or both of these, or a combination of some or all of the preceding, on complicated two- or three-dimensional surfaces. Due to the complexity of both the governing physical equations and the boundary conditions, most practical problems are too complex to solve by hand calculations.

Numerical modeling techniques are performed with the assistance of a digital computer to provide approximate solutions to these equations. Many different numerical modeling techniques are available. One such technique is the finite element method (FEM).

As we describe more fully hereafter, the traditional practice of the FEM calls for a spatial region of interest to be subdivided into a plurality of perfectly juxtaposed cells (i.e. cells that are juxtaposed without overlaps or interstitial voids), referred to as elements. Discrete nodes, where solution data is tracked, are defined on the inter-element boundaries and, sometimes, also within the element interiors. We refer to the network of elements and nodes as a mesh.

The FEM does not seek an exact solution to the physical field equation. The FEM assumes that within each element, the field can be described adequately by a summation of simple functions, such as polynomials, that are chosen, inter alia, for both convenient analytical properties and to provide an adequate approximation. The coefficients of the respective polynomials, corresponding to governing solution quantities at the nodes, in such a summation are referred to as degrees of freedom (DOF). The polynomials are frequently normalized in such a way that the DOF are equal to, or otherwise relate to, the values of the field variable at the nodes. Between the nodes, the polynomials interpolate the values of the field variable in a continuous fashion.

The polynomials themselves are known a priori. Therefore, the field values within a given element are determined by specifying the values of the DOF for that element. In FEM, the DOF values are not determined directly using the field equation; instead, a mathematical condition is derived from the field equation which imposes that a certain measure of error (i.e., between the approximate and exact solutions) must be small. Applying this condition to the field equations results in a system of equations in which the unknowns are the DOF. These equations are well suited for solution by a digital computer, since they can be solved via s a large number of repetitive, mechanical manipulations of stored quantities.

The system of equations pertaining to a given element within a mesh is not solved in isolation. Instead, the sets of equations belonging to all elements of the mesh are collected into a single system of equations describing the global behavior of the problem of interest. Suitable modifications are made to the global system equations to account for boundary conditions. Then, the global system is solved automatically by any of a number of standard methods of digital computing. The ability to solve problems with extremely complex geometry by composing the simple behavior of a multitude of elements is the main innovation of the FEM.

In application to wave propagation physics, the FEM can be applied in several ways. Physically, waves propagate in time and space, so the FEM may be applied directly to this approach. Typically, the FEM is used to model the spatial variation of the wave field, and a separate time-integration or stepping algorithm is used to advance the wave from one instant to the next. The time-integration algorithms in most common use are categorized as "implicit" or "explicit", referring to whether the solution for the next instant in time is defined as an explicit function of the previous data, or whether an implicit system of equations, relating old to new data, must be solved. Implicit solution approaches are preferred if time increments between old and new data yield savings which are large enough to offset the high cost of solving an implicitly defined system of equations at each increment. Explicit solution approaches are preferred if short time increments are necessary for physical reasons, such as capturing the transient effects of pulse-type waves. Alternatively, and very commonly in wave analysis, time-domain solutions are not sought at all: the time variable is transformed mathematically (typically using a Fourier or Laplace transform) to an auxiliary variable corresponding to the frequency of a steady-state wave. Full understanding of the wave physics for a given problem of interest is derived from solving the solution at multiple frequencies; each solution is independent of the other, unlike time-domain solutions, which depend on the history up to that instant.

Special challenges arise when attempting to obtain a mathematical solution, either exact or approximate, to any problem involving scattering and/or radiation of waves in an unbounded region (that is, in open or free space or in an environment, such as a large body of water, where the region is perceived as essentially unbounded). For example, the problem may comprise radiation of acoustic, elastic or electromagnetic waves. The mathematical solution to such problems must satisfy a so-called "radiation condition," often known as the Sommerfeld condition, in order for a unique solution to exist. The condition states that all waves "at infinity" are only traveling outward toward infinity, not inward from infinity. Thus, all the energy in the problem resides in the radiated or scattered waves, which are traveling outward after their interaction with an object; no energy is created at infinity. Note that the radiation condition is a condition that exists "at infinity," not at a finite distance. Much of the history of computational methods for such problems has been focused on how to obtain approximate, numerical solutions that satisfy the radiation condition to an acceptable accuracy, while not being prohibitively expensive. Truncation of the computational model is required at some distance from the source, because computer resources are always limited. Balancing the size of the model with the requirement to model radiation to infinity is the main challenge in selecting where the truncation is made.

The Finite Difference (FD) Time Domain method can be used for large and small problems as well and is generally considered computationally efficient. However, FEM is preferred for realistic engineering problems because FD typically uses stair-stepped rather than conformal approximation of model geometry and "staggers" the field quantities at different locations compromising the accuracy of a solution. The FEM, because of its versatility in handling objects of virtually any geometric shape and material, is generally the method of choice for modeling the finite part of the problem, i.e., the object and, sometimes, a finite part of the open region surrounding the object. It is a continuing challenge to deliver an accurate model for the remainder of the infinite region, including the radiation condition at infinity. Methods for accurately modeling the infinite region generally fall into five classes, with differing applicability and efficacy for time-domain, frequency-domain, implicit and explicit methods of analysis.

A first class uses boundary integral equation methods (BIEM). Here, an integral equation that satisfies the radiation condition exactly can be applied directly on the outer surface of the object. Its advantage, which seems compelling at first sight, is that the infinite exterior domain is replaced, with no loss in physical approximation, by a relatively small surface, which greatly reduces the computational size of the problem. However, it has a severe disadvantage. The matrices in the resulting BIEM discretization of the integral equation are fully populated, making the computational cost prohibitive for large-scale implicit problems. The BIEM can be accelerated through the use of fast-multipole iterative algorithms, but this adds significant complexity to the software. BIEM approaches are much more successful in the frequency domain than the time domain.

A second class uses exact solutions to the wave equation in open regions, often expressed as infinite series of known functions, e.g., wave functions or multipoles. These are joined to the solutions in the finite region in a manner that approximately establishes continuity along, e.g., a closed boundary surrounding the object. This approach suffers from the same disadvantage as the BIEM, namely, that the resulting discretized equations are fully populated, and hence the computational cost is expensive. Wave function solutions are also more successful in the frequency than time domains.

A third class involves constructing an artificial boundary surrounding the object, then applying a so-called absorbing or non-reflecting boundary condition (ABC) that will make the boundary appear as transparent as possible to all outward traveling waves, i.e., the radiated or scattered fields. The primary advantage is that the resulting discretized equations have sparse matrices. Consequently, this property reduces the computational cost dramatically. However, ABC's, which are applied to a boundary at a finite truncation distance, can only approximate the exact radiation condition at infinity. Therefore, spurious (non-realistic) waves are reflected from the artificial boundary, which then propagate throughout the entire finite region, contaminating the entire solution. Although this effect may be mitigated by moving the artificial boundary farther away from the object, this movement only increases the size of the finite region. Consequently, the computational cost once again increases. However, ABC approaches have been successfully applied in both time and frequency domains, for implicit and explicit time-integration schemes.

A fourth alternative to the aforementioned approaches is the use of so-called "infinite elements." Infinite elements are in fact finite elements that model a semi-infinite sector of space in the same way that finite elements do. To use infinite elements, one first constructs an artificial boundary surrounding the object. However, instead of using ABCs, modal expansions or the BIEM, one defines a single layer of infinite elements around the entire artificial boundary. Because the "infinite" element algorithm imitates the structure of a finite element, the solution algorithm does not change, and the structure of the system of equations is the same as if the infinite elements were finite elements.

Infinite elements have proven extremely useful in solving problems in acoustics. Such uses for infinite elements are described, for example, in the article by D. S. Burnett, "A Three-Dimensional Acoustic Infinite Element Based on a Prolate Spheroidal Multipole Expansion," J. Acoust. Soc. Am. 96 (1994) 2798-2816 (BURNETT 1994). Acoustic infinite elements are advantageous in that they exhibit both high accuracy and high speed of computation, in frequency- and time-domain approaches to wave problems.

The idea of coupled finite element (FE)/infinite element (IE) approximation for exterior wave propagation problems dates back to the pioneering contributions of Bettess, and Bettess and Zienkiewicz. The works of Astley et al., Cremers et al., Givoli and others recognized the spectral character of the approximation and pointed to the necessity of multipole expansions. Burnett advanced the approach from the practical point of view, by introducing a new, symmetric unconjugated formulation using prolate and oblate spheroidal elements. Contrary to the concept of Perfectly Matched Layer (PML; see below), and other techniques based on Absorbing Boundary Conditions (ABCs), the conjugated element of Astley et al., aims at obtaining the solution in the complete unbounded domain.

A fifth alternative to an absorbing boundary "condition" is an absorbing boundary "layer." An absorbing boundary layer is a layer used in a model wherein an artificial absorbing material is placed adjacent the edges of the grid independent of the boundary condition. A wave entering the absorbing boundary layer is attenuated by the absorption and decays exponentially such that any reflection is exponentially tiny. This is a numerical abstraction of the absorptive layers used in anechoic chambers to simulate radiation to infinity by minimizing reflections from the chamber walls.

One type of absorbing boundary layer is known as a perfectly matched layer (PML). The key property of a PML that distinguishes it from an ordinary absorbing material is that it is designed so that waves incident upon the PML from a non-PML medium do not reflect at the interface between the PML and the non-PML. This property allows a properly designed PML to strongly absorb outgoing waves from the interior of a computational region while minimizing reflection of the waves back into the interior of the model.

PML was originally formulated by Berenger in 1994 for use with Maxwell's equations for electromagnetic waves, and since that time, there have been many reformulations of PML for both Maxwell's equations and for other wave equations. Berenger's original formulation is known as a split-field PML, because it divides electromagnetic fields into two auxiliary fields in the PML region. A later, more popular formulation, because of its simplicity and efficiency, is called uniaxial PML or UPML (Gedney, 1996), in which the PML is described as an artificial absorbing material, wherein the properties of the PML are different in different directions, e.g., crystals that measure differently or behave differently along two or more axes.

Although both Berenger's formulation and UPML were initially derived by manually constructing the conditions under which incident do not reflect from the PML interface from a homogeneous medium, both formulations were later shown to be equivalent to a more general approach: stretched-coordinate PML (Chew and Weedon, 1994; Teixeira and Chew, 1998). In particular, PMLs were shown to correspond to a coordinate transformation in which one or more coordinates are mapped to complex numbers. More technically, this constitutes an analytic continuation of the wave equation into complex coordinates, replacing propagating, oscillating waves by exponentially decaying waves. This viewpoint allows PMLs to be derived for inhomogeneous media such as waveguides, as well as for other coordinate systems and wave equations.

PML absorption is, in practice, imperfect and depends on the incident angle of a wave. As a wave approaches glancing incidence with respect to the interface between the PML and the non-PML, the attenuation of the wave goes to zero. Consequently, waves sufficiently close to glancing incidence will have round-trip reflections through the PML, thereby introducing artifacts into the solution. Further, where the medium through which the wave propagates is inhomogeneous, without a uniform composition or structure, the PML can fail to absorb and attenuate the wave to create an appropriate model to generate an ultimate solution.

PML absorbing layers with finite elements generally support fast performance and can be applied for non-convex geometries, but require truncation of the model in the computational domain. Additionally, the PML do not absorb all waves in an exact manner since approximate, nonphysical absorptive equations are necessarily used.

Despite the evolution of a variety of FEM modeling technologies and various approaches for providing efficient approximations for wave propagation in unbounded domains, there still exists a significant need for more advanced solutions to support progressively more complex modeling while simultaneously maintaining and improving accuracy, with inclusion and deployment on both desktop and massively parallel computing systems. A need exists for such a computer-implemented apparatus and method for efficiently and cost-effectively modeling wave propagation systems including infinite exteriors based on time-domain explicit finite element calculations wherein it is desirable for the solution approach to exhibit certain characteristics and features.

A preferred solution approach would minimize boundary reflection artifacts in finite-element wave equation computations associated with time-domain explicit finite element calculations or frequency-domain finite element calculations.

Moreover, it would not alter the fundamental algorithmic and data structures of either approach, so that coding and parallelization efficiencies are realized to the maximum potential.

Further, a preferred solution would support time-domain explicit finite element acoustic wave equation computations using a large memory and a high-speed processor, or a multiprocessor massively parallel computing system for execution of associated numerical simulation software.

SUMMARY

In view of the foregoing described needs, embodiments of the invention include a computer-implemented method and apparatus for modeling infinite exteriors for wave phenomena including acoustic, electromagnetic and elastic wave phenomena wherein the method comprises the inclusion of a hybrid absorbing element defined by implementation of a hybrid PML/infinite element. The hybrid combines aspects of a perfectly matched layer and infinite element concepts in support of specific requirements of time-domain explicit finite element calculations, although the approach is viable for frequency-domain calculations without alteration. For simplicity, features and functions of the apparatus and method are described herein with specific reference to acoustic modeling; however, the apparatus and method are equally applicable to modeling other wave phenomena, including electromagnetic and elastic wave phenomena. An important result associated with the use of the apparatus and method described herein is the ability to reduce the size of the computational domain for solving various wave propagation models in different materials.

In its various aspects and embodiments described herein, the apparatus and method provide an absorbing boundary region for termination of a finite-element time domain computation region, thus reducing unwanted artifacts (i.e. reflections and diffractions) arising from truncated boundaries imposed on a numerical acoustic model. Since each new hybrid element component extends all the way to infinity, essential radiation conditions are applied exactly "at" infinity.

In its various aspects and embodiments described herein, the apparatus and method consist of using the algorithmic structure of an infinite element formulation, and the physically-inspired gradation of absorptive properties within the element characteristic of a PML. This combination applies to frequency- or time-domain FEM solution approaches.

The apparatus and method support modeling to absorb simulated wave field energy arriving at arbitrary incident angles at the boundaries of a finite element computational model accurately, minimizing increases in either required computer memory capacity or computation time.

Still further, the apparatus and method comparatively reduces computational time and computer memory requirements by reducing the number of variables and computational layers that are employed in the absorbing boundaries and infinite element components. The apparatus and method delivers higher accuracy when compared with the use of infinite elements or PMLs alone, because the absorptive property of the PML is enhanced by the physically accurate construction of the infinite element. This high accuracy is leveraged by the apparatus and method to support higher computational speeds since the new hybrid elements can be placed close to the modeled object, typically much less than half a wavelength, resulting in a smaller finite computational region, as compared to larger computational regions associated with the use of absorbing boundary conditions alone.

The apparatus and method support a computer-implemented method and software capable of generating high resolution, accurate images of acoustic wave propagation for a myriad of applications from sonar, to medical imaging and seismic imaging.

According to an aspect of the apparatus and method herein, the foregoing and other objectives and advantages are attained in a method of reducing reflection artifacts that are introduced in finite-element wave field propagation computations by reflections from artificial boundaries. These artificial boundaries, also known as truncation boundaries, are inherent in any computational model of an unbounded domain. Accuracy improves if the truncation boundaries are placed far from the sources of waves; since computational resources are limited, it may not be possible to place them far enough to eliminate reflection artifacts. The proposed hybrid infinite element will reduce the reflection artifacts at these boundaries, or allow the computational model size to be reduced significantly while maintaining acceptable accuracy.

In a first aspect of the apparatus and method herein, using as an example an acoustic model, we compose two types of modeling conditions, the PML and infinite element, to form a hybrid absorbing region surrounding the truncated acoustic model boundaries, thus providing an absorbing region which presents an essentially reflectionless interface for outgoing acoustic waves. Accordingly, the computational domain boundaries are terminated in a manner that absorbs simulated wave energy contained in an advancing acoustic wave. Further, unwanted reflection artifacts, which would otherwise be reflected from artificial boundaries, are eliminated or dramatically reduced.

Reflection elimination according to the method described herein uses a hybrid modeling scheme to provide an absorbing region effective at essentially all incidence angles of the advancing wave. PML conditions are embedded in infinite elements, coupled to finite-element wavefield computation regions.

In another aspect, a highly efficient representation of the hybrid absorbing conditions is achieved by reducing the number of degrees of freedom used computations using only a conventional PML, or only conventional infinite elements.

In yet another aspect, the apparatus and method includes an apparatus comprising a computer programmed for solution of wave propagation problems wherein application of the apparatus and method eliminates undesired reflections and diffractions from truncated boundaries imposed on three-dimensional finite element acoustic applications. For a large-scale simulation, the computer is a massively parallel machine, a cloud resource, or similar clustered or distributed compute and storage resources.

The apparatus and method herein for implementing absorbing regions with infinite elements, integrated with PML, is beneficial for its rapid attenuation of waves arriving at arbitrary angles, which leads to elimination of reflection artifacts, and is ideal for implementation on massively parallel super computers or across elastic cloud computing resources. In these large three-dimensional applications, where computational regions for the acoustic model are desirably partitioned between multiple processors, artificial boundaries are inherently created between multiple processors. Accordingly, employing the hybrid absorbing element modeling scheme optimizes the absorbing region to reduce memory usage and the related computational costs, especially when applied to large three-dimensional acoustic models and simulations.

In use, the apparatus and method may be implemented on a computer, using the hybrid absorbing element in combination with finite element computations to produce a visual model of a device or system of interest for further analysis and manipulation. The number of elements required in a model after application of the apparatus and method is significantly reduced from the number required using conventional methods, frequently resulting in orders of magnitude reduction in compute time.

The computer-implemented method and apparatus operates spatially local, yielding minimal communication across DOFs, to minimize data storage and data transmission costs. In the time-domain implementation, the method uses only second-order time derivatives to ensure compatibility with explicit central-difference time integration schema wherein the second-order derivatives are diagonal to represent a lumped mass. The method likewise exhibits time-stable performance with central differences. Still further, the method provides a simplistic finite element configuration structure that can be easily understood and implemented by a user.

Further, the method converges to correct low frequency (Laplacian) limits. Consequently, the method exhibits high accuracy across broadband dynamic frequency ranges. Convergence to high-frequency wave-absorption limits is common among many ABC, PML, and comparable formulations. Accurate representation of low-frequency wave propagation in small computational domains is much more challenging, but the use of an infinite element framework for the hybrid absorbing element ensures this property.

The apparatus and method herein has a wide range of useful applications. By simulating and modeling wave field in and around engineering structures and their interaction with the radiating structure, the design of the structure can be more quickly and efficiently modified to improve or optimize desired or undesired radiative behavior.

For example, various aspects and embodiments of the apparatus and method described herein can be fundamentally applied to reduce overall radiation or to alter the radiation directivity pattern of an acoustic device (transducer, sonar, loudspeaker), a structure whose noise characteristics are of interest (automobile, machinery, submarine) or an electromagnetic device (antenna, microwave device, circuit board). In addition, applications in the time domain include quantifying the effects of underwater blast waves on ships, submarines, offshore and marine structures, or bridges.

Applications include, among others, medical ultrasound, acoustic therapeutics, high intensity focused ultrasound, nondestructive evaluation and testing, seismic analysis, sensor and transducer design, micro-electromechanical systems, surface acoustic wave filters and other acoustic applications. There are also military applications to SONAR and SONAR countermeasures, underwater vehicles, submarines, surface ships. Automotive and aerospace applications involving acoustic propagation such as radiated noise from an engine or space launch site, and geophysical applications such as seismic design and oil exploration are clear.

BRIEF DESCRIPTION OF THE DRAWINGS

For a more complete understanding of various embodiments of the apparatus and method described herein, reference is made to the detailed description contained herein and the accompanying drawings numbered below which are given by way of illustration only and are not intended to be limitative to any extent. Commonly used reference numbers identify the same or equivalent parts of the apparatus and method throughout the several figures. Now, therefore.

DETAILED DESCRIPTION

The following detailed description is merely exemplary in nature and is in no way intended to limit the invention, its embodiments, its application, or its uses. Following is a description of an exemplary embodiment of a hybrid absorbing element 10 of the computer-implemented apparatus 20 and method 100 for finite element explicit time difference calculations leveraging the hybrid absorbing element 10 described by modeling parameters comprised of perfectly matched layers and infinite elements to create a hybrid configuration having the performance characteristics desired.

Figure 1A:
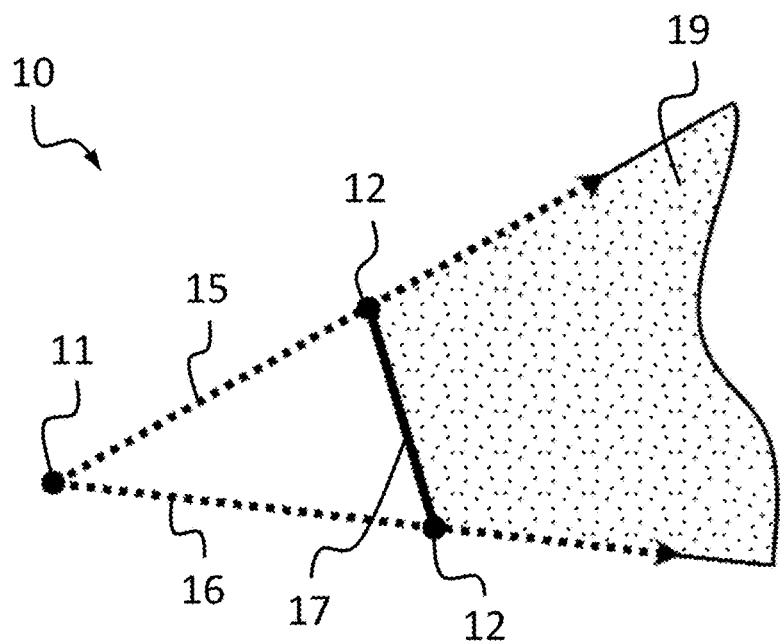
FIG. 1A is a two-dimensional illustration of components which define a hybrid absorbing elements, according to the invention.
Figure 1B:
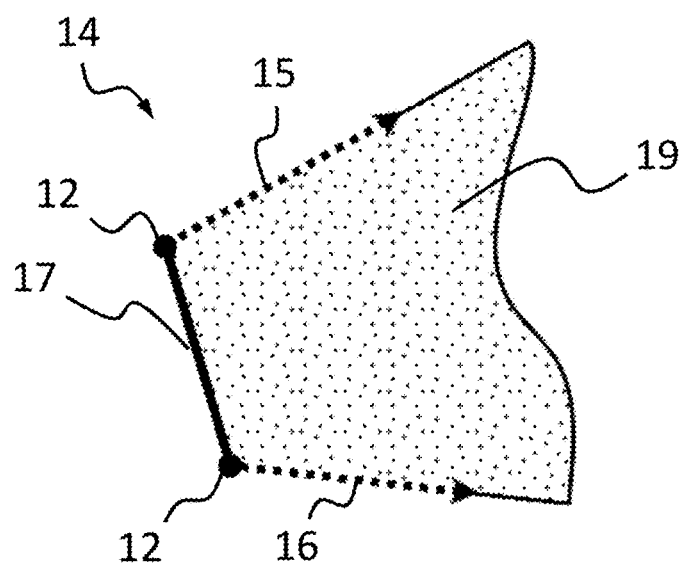
FIG. 1B is a two-dimensional illustration of the hybrid absorbing element according to the invention, emphasizing the semi-infinite facet.

Now referring to FIGS. 1A and 1B, a simplified two-dimensional illustration of a hybrid absorbing element 10 used in the apparatus 20 and method 100 herein is described. A hybrid absorbing element 10, as defined more fully herein, is comprised of a single finite-sized base facet 17 and a plurality of semi-infinite facets 14. For example, a quadrilateral hybrid absorbing element 60 (FIGS. 10A and 10B) consists of a finite quadrilateral base facet 67 and four semi-infinite facets 14; a triangular hybrid absorbing element 70 (FIGS. 11A and 11B) consists of a finite triangular base facet 77 and three semi-infinite facets 14. Other hybrid absorbing element configurations consisting of more than four semi-infinite facets 14 based upon base facets having more than four sides are supported by the apparatus 20 and method 100.

The finite element structure, also known as the mesh, is comprised of a plurality of finite elements, each of which consists of base facets of shell-type geometry. For simplicity, the structure of each element is first described in the context of a two-dimensional view of the hybrid absorbing element 10 having semi-infinite facet 14 illustrated in FIGS. 1A and 1B.

As illustrated in FIGS. 1A and 1B, from a two-dimensional perspective, a semi-infinite facet 14 of the hybrid absorbing element 10 according to an aspect of the invention is defined by an interior point 11 and a boundary or base facet 17 defined by nodes 12. Infinite-direction bounding rays 15, 16 emanate from the single interior point 11 common to all infinite elements in a set. The bounding rays 15, 16 are defined from the interior point 11, through each infinite element node 12. Alternative definitions of the bounding rays 15, 16 at nodes 12 are permissible, as long as the hybrid absorbing elements 10 which share a node 12 share the bounding ray emanating from that node 12. For example, in an alternative embodiment, not shown here, each single interior point 11 may be replaced with a pair of user-defined points, allowing prolate-spheroidal or oblate-spheroidal geometry to be used to define bounding rays 15, 16 shared between adjacent hybrid absorbing elements 10. This ensures that the volumes of the hybrid absorbing elements 10 will in entirety fill the exterior volume of the model.

The hybrid absorbing element 10 comprises a semi-infinite volume 19 defined by the base facet boundary 17, and the infinite-direction bounding rays 15, 16. Additional detail addressing the configuration and use of hybrid absorbing elements 10 based upon the semi-infinite facet 14 is subsequently provided to more fully explain the use of the semi-infinite facet 14 for modeling according to various embodiments of the apparatus 20 and method 100.

Figure 2:
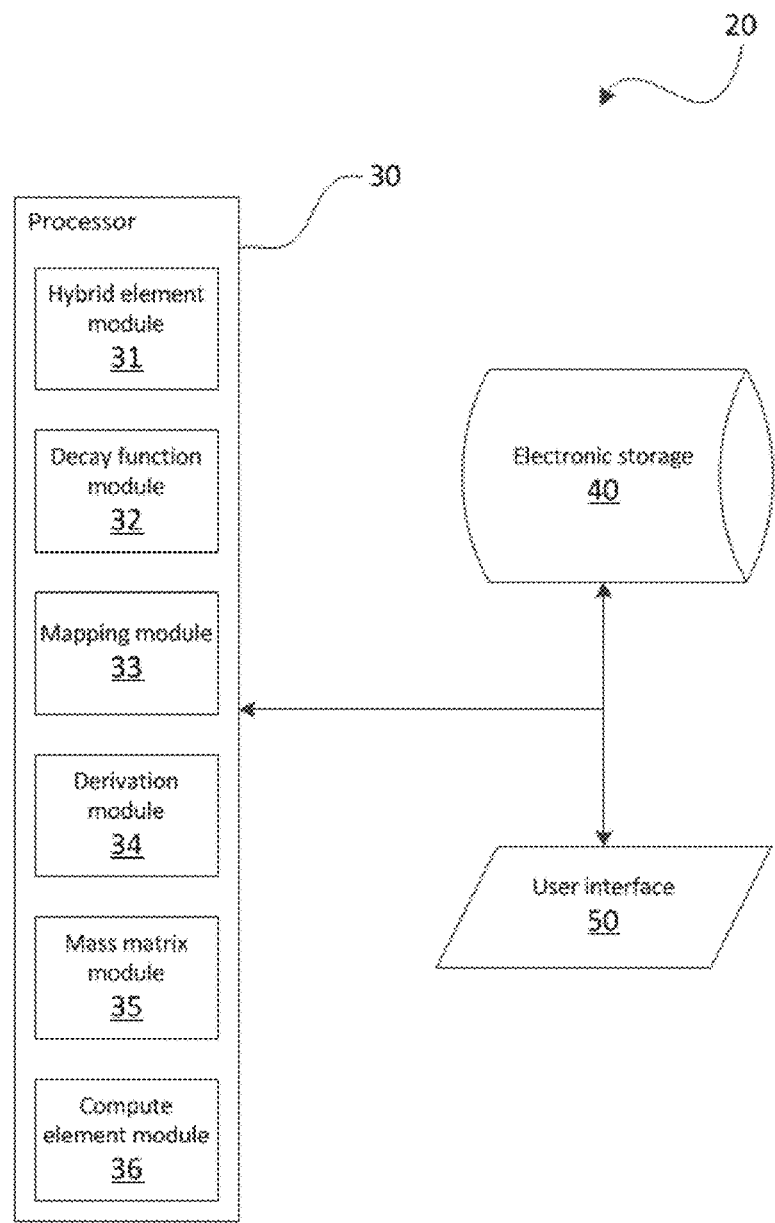
FIG. 2 is a structural schematic of components and modules associated with the apparatus.

Referring to FIG. 2, we describe an exemplary basic configuration of the apparatus 20 associated with the method 100 herein. The apparatus 20 includes a processor 30 with access to electronic data storage 40, wherein the processor 30 and associated operations are accessed via a user interface 50. Processor 30 orchestrates functionality of various modules to generate an ultimate solution. Modules that operate on processor 30 include hybrid element module 31, decay function module 32, mapping module 33, derivation module 34, mass matrix module 35, and compute element module 36.

Modules 31, 32, 33, 34, 35, and 36 may be implemented in software, hardware, firmware, some combination of software, hardware, and firmware, or otherwise implemented. It should be appreciated that although modules 31, 32, 33, 34, 35 and 36 are illustrated in FIG. 2 as being co-located within a single processing unit. For implementations in which processor 30 includes and supports multiple processing units, modules 31, 32, 33, 34, 35, and/or 36 may be located remotely from the other modules and associated with additional individual processors 30. Further, the description of the functionality provided by the different modules 31, 32, 33, 34, 35 and 36 described below is for illustrative purposes, and is not intended to be limiting, as any of modules 31, 32, 33, 34, 35 and/or 36 may provide more or less functionality than is described. For example, one or more of modules 31, 32, 33, 34, 35, and 36 may be eliminated, and some or all of the functionality may be provided by other ones of modules 31, 32, 33, 34, 35, and 36. As another example, processor 30 may support one or more additional modules that may perform some or all of the functionality attributed below to one of modules 31, 32, 33, 34, 35, and 36.

Figure 3:
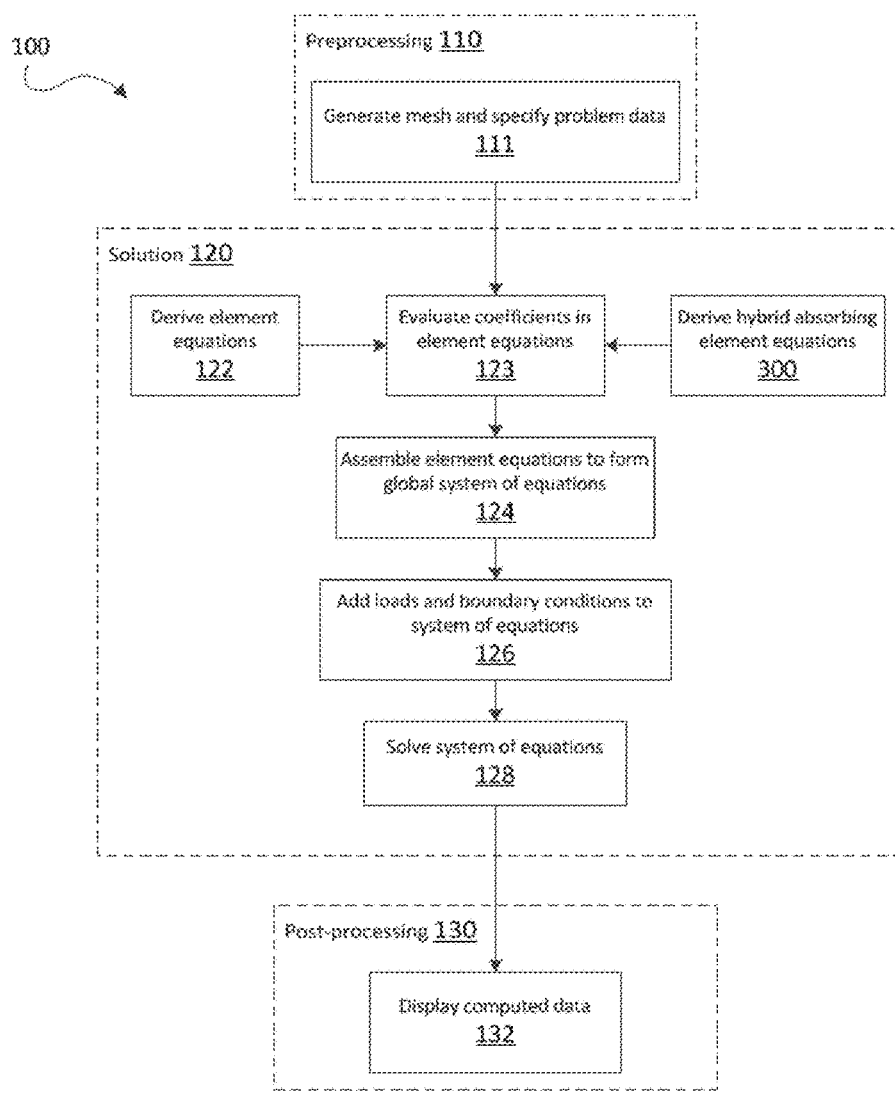
FIG. 3 is a top-level structural flow diagram of an embodiment of the method configured to determine and model wave field propagation directed to FEM modeling.

The various aspects and embodiments of the apparatus 20 and method 100 leverage features of the finite element method. FIG. 3 is a top-level structural flowchart of fundamental modules and processes associated with the apparatus 20 and method 100 herein. More particularly, the computer-implemented method 100 implements the finite element method (FEM), performed with assistance of one or more computers or computer processors, for predicting behavior of a physical system by obtaining numerical solutions to mathematical equations that describe the system and its loading conditions. Referring to the flowchart of FIG. 3, the use of the FEM as taught by the method 100 may be thought of as comprising three primary compute phases: preprocessing 110, solution 120, and post-processing 130.

Figure 4:
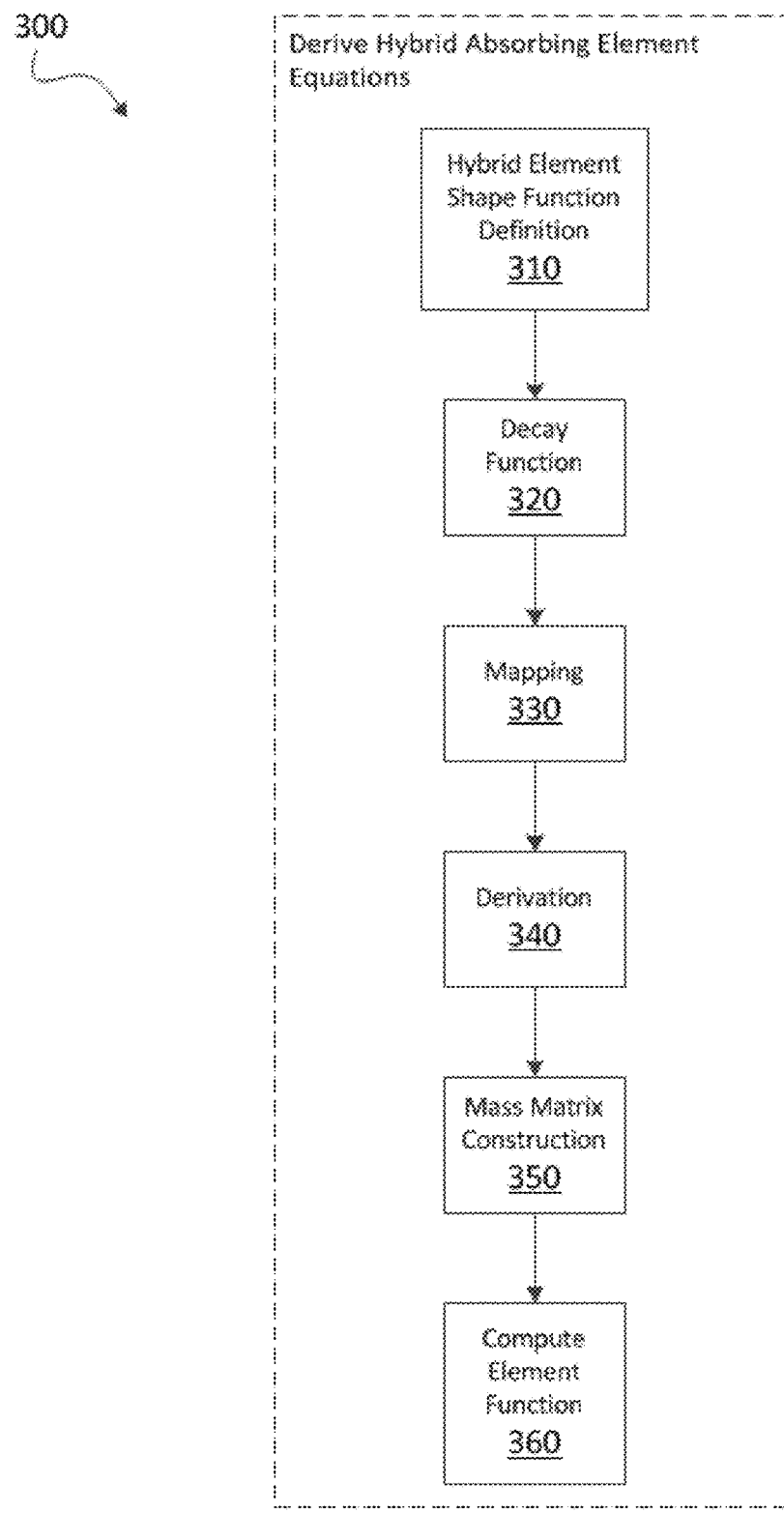
FIG. 4 is a top-level flowchart of processes associated with defining a hybrid absorbing element associated with the FEM model.

Now, in still greater detail, referring to FIG. 2 and FIG. 4, the apparatus 20 and method 100 according to various aspects and embodiments of the invention is described.

Hybrid element module 31 drives hybrid element shape function definition process 310 to support one or more subsequent interpolation functions wherein element shapes are defined in two and three spatial dimensions.

Decay function module 32 applies and drives decay functions 320 to specify the PML-like function governing the rate of decay of an acoustic wave field inside the hybrid infinite element domain. The decay functions 320 also affect the variation of the acoustic wave field in directions tangent to the terminating surface or base facet: the decay function must specify zero added damping so that the field impedance at the surface of the hybrid absorbing element 10 is matched to that of the adjacent finite element.

Mapping module 33 drives a mapping process 330 wherein a coordinate map is associated with the hybrid absorbing element model and described in part by the base facet shape functions, in part in an isoparametric manner, and in part by a singular function. Together, the isoparametric and singular functions map the true, semi-infinite domain onto the parent element quadrilateral. To specify a map for a given element, distances are defined between each infinite element node on a base facet and the element's reference node. Intermediate points in the infinite direction are defined as offset replicas of the nodes on the terminating surface.

With reference to FIG. 3, in a preprocessing phase 110, at step 111, the physical domain of the problem is partitioned into a pattern of subdomains of simple geometry, referred to as "elements." The resulting pattern associated with the geometric configuration of the elements is referred to as a "mesh." In addition, problem data such as physical properties, loads, and boundary conditions are specified.

In a solution phase 120, a system of equations which governs the wave propagation of the problem of interest is addressed and solved. The solution phase 120 of FIG. 3 is carried out in a programmed computer/data processor 30. In step 122 of solution phase 120, an element system of equations is first derived. The element system of equations comprises a set of numerically computable mathematical formulas that are derived theoretically and implemented into the computer code that forms the FEM program. At step 123, numerical values are computed for the coefficients in the "element equations" associated with each element in the mesh.

During computer implementation of the FEM program, the code for these formulas associated with the element equation is accessed by each element in the mesh. Numerical values are computed for the coefficients in the formulas using the geometric and physical data associated with each individual element.

At step 122, derivation of the element equations embodies the following aspects. The unknown field variable(s), for which the finite-element analysis is seeking a solution, is represented approximately within each element as a finite sum of known functions, referred to as "shape" functions. These shape functions are chosen to be polynomials, typically, although alternative functions may be used. Unknown parameters, referred to as "degrees of freedom" (DOF), become the new unknowns for which the finite-element analysis finds values by solving the global system of equations. The DOF values that the unknown field variable takes at specific points in the element, are referred to as "nodes." When values for the DOF are subsequently computed in step 128, the approximate FEM solution will then be known everywhere, continuously, throughout each element. Both the shape functions and the parameters will be known, and these, together, define the complete solution in the entire problem domain At step 123, coefficients in the element equations are evaluated and numerical values for those coefficients are generated. These coefficients are stored in electronic storage 40 such as digital memory. The representation of the unknown field variable in terms of shape functions is inserted into the governing physics equations. The physics equations are differential or integral equations that express the physical laws to which the physical system is subject. These differential equations reduce to a system of algebraic equations which describe the element equation. The expressions for the coefficients in the element equation are manipulated to support optimized computing.

At step 124, the element equations for all the elements associated with the analysis are combined or assembled into one global system of equations. The equations associated with all the elements that share nodes in the mesh will contribute terms to the equations governing the DOF at that node, thereby establishing continuity in the field variable from element to element. The system of equations grows larger and larger as element equations are aggregated, resulting in one global system of equations. Element coefficients are assembled to form a system of equations wherein system equation coefficients are maintained in electronic storage 40.

For clarity, further aspects of the method 100 will be described in association with the quadrilateral hybrid absorbing element 60 illustrated in FIGS. 10A and 10B. However, the following descriptions will be applicable to other forms of hybrid absorbing elements 10, such as the triangular hybrid absorbing element 70 illustrated in FIGS. 11A and 11B. With continuing reference to FIG. 4, the equations defining the hybrid absorbing element 60 are derived and likewise incorporated within the global system of equations at step 124.

Subsequently, in step 126, the global system of equations is modified to consider boundary and loading conditions applicable to the physical system being modeled. In step 128, the system of equations is solved, using any of a variety of numerical analysis techniques. Since there are thousands, or even millions of unknown DOF, depending on the problem to be solved, the solution of the system of equations is preferably distributed across one or more computers or processors.

The result of the solution phase 120 is a description of the values assumed by a field variable throughout the mesh. This result is then subjected to post-processing 130 in a processor 30, and output to a storage device 40 or user interface 50 such as a display device. The result may also be exported to other software systems and processors for further analysis.

In the post-processing phase 130, at step 132, the final solution to the system of equations is processed for presentation or display to a user analyst in a plurality of different meaningful forms. In the post-processing phase 130, other useful information may be derived from the solution and likewise displayed to a user.

It is a general property of the solution phase 120 that as the physical wave frequency increases, the computational burden increases significantly. Consequently, it is advantageous to use, for data processor 30, a parallel processor, such as a massively parallel processor or a scalable parallel processor. In addition, data processor 30 can likewise be comprised of a plurality of cloud-based computing resources to support elasticity of demand for use and to address significantly larger modeling requirements driven by either the physical size of the model, required accuracy, and/or wave frequency.

The solution for an acoustic problem according to an embodiment of the method 100 in an unbounded exterior space is assumed to be linear and governed by the same equations as the finite acoustic region. A parameter is used to denote velocity-dependent "volumetric drag" (material damping/loss) which may exist in fluid associated with the acoustic medium. Where the infinite exterior of a region of acoustic fluid is bounded by a convex surface and a conventional finite element mesh defined on the surface, each facet of the surface mesh, together with the normal vectors at the nodes, defines a subdivision of the infinite exterior, referred to as the infinite element. Further derivation according to one embodiment of the method establishes values for other dependent variables.

A diagonal mass matrix ensures that the implementation of the underlying algorithm is efficient for explicit transient dynamic simulations. In finite elements, low-polynomial-order element mass matrices are lumped into diagonal entries. In an embodiment of the hybrid absorbing element, infinite direction functions are handled differently and selected such that they are orthogonal with respect to the mass integral, so that the contributions are naturally diagonal.

In one embodiment of the invention, the element shape and test functions for the hybrid absorbing element 60 consist of conventional low-order isoparametric finite element functions defined on the base facet 67, multiplied by a set of high-order polynomials in the infinite direction.

By carefully selecting polynomials to be used in the infinite direction, only the degrees of freedom at the base of the hybrid absorbing element 60 are coupled to the finite element mesh, avoiding the need to transform the element's diagonal mass into a non-diagonal form in order to couple to the mesh. Many different sets of orthogonal functions may be derived to achieve this property. Each of the functions are normalized so that the first function has unitary value at the finite element mesh, like the finite element neighbors, and the higher functions are normalized with respect to the mass integral. Once corresponding weight functions are completed, the functions are presented such the element may be computed conventionally.

Referring now to FIG. 4, the hybrid absorbing element definition process 300, hereinafter the HAED process 300, is described in greater detail. The process 300 of defining the hybrid absorbing element 60 comprises several steps including hybrid absorbing element shape function definition 310, decay function 320, mapping 330, derivation 340, mass matrix construction 350, and compute element function 360. These steps will be described in further detail for the simplest embodiment of the invention, linear acoustic wave propagation.

Figure 5:
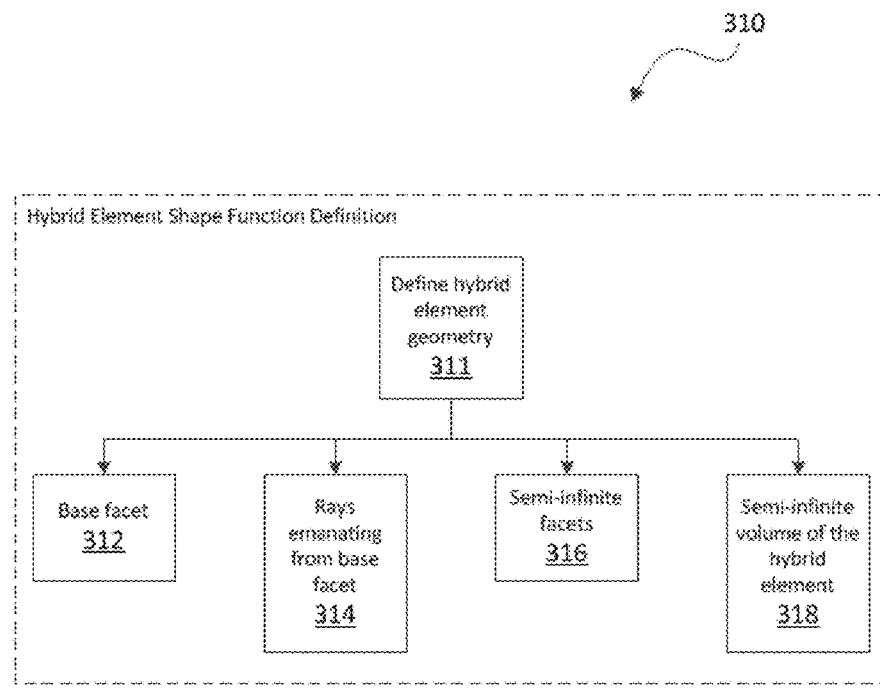
FIG. 5 is a structured flowchart of the processes and components associated with the hybrid element shape function definition module of FIG. 4.

Referring now to FIG. 5, additional details associated with hybrid absorbing element shape function definition 310 are described. First, in step 311, the hybrid absorbing element geometry is defined. The hybrid absorbing element geometry includes definition of the base facet 67 in step 312, definition of the rays 65 emanating from the base facet 67 in step 314, definition the semi-infinite facets 14 in step 316, and definition of the semi-infinite volume 69 of the hybrid absorbing element 60 in step 318.

Decay Function

Figure 6:
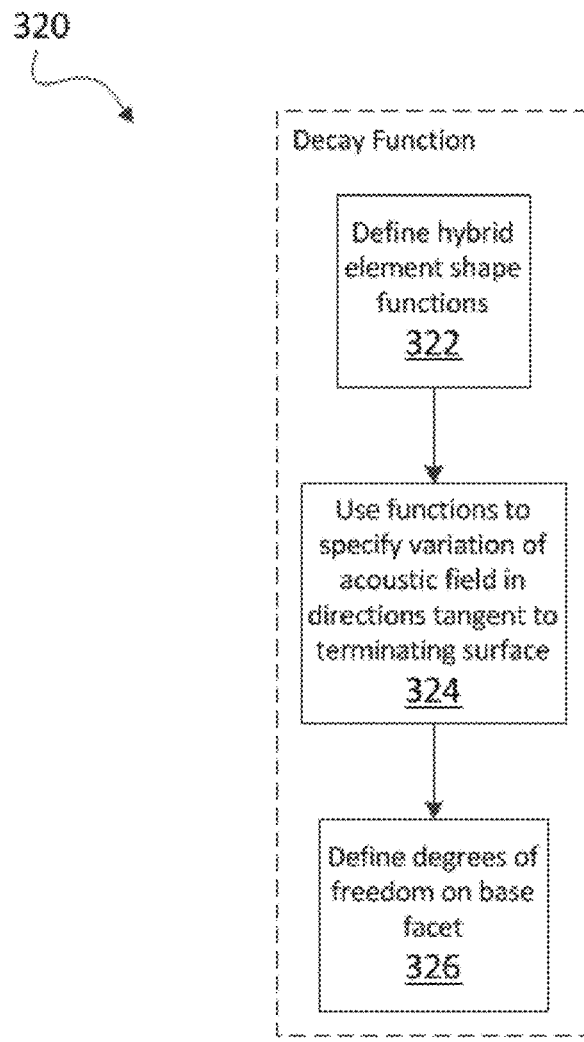
FIG. 6 is a structured flowchart of the processes and components associated with the interpolation module of FIG. 4.

Referring now to FIG. 6, the HAED process 300 includes functions and implementation steps to support a decay function module 320. First, in step 322, hybrid absorbing element shape functions are defined as follows:

$$\varphi_i(g, h, r(\xi)) \equiv f b_\alpha B_\beta$$

where $$f \equiv \sqrt{\frac{r_0(g, h)}{r}}$$

in two spatial dimensions and $$f \equiv \frac{r_0(g, h)}{r}$$

in three spatial dimensions. The shape functions serve to specify the minimum rate of decay of an acoustic field inside the infinite element domain. The subindex $\alpha$ ranges over the n nodes of the base facet 67 of the infinite element, while the subindex $\beta$ ranges over the number of functions used in the infinite direction. The function index i is equal to the subindex $\alpha$ for the first n functions, i=n+$\alpha$ for the second n functions, and so on.

The functions $b_\alpha(g, h)$ are conventional two-dimensional shape functions (in three dimensions) or, with h=0, one-dimensional shape functions for axisymmetric or two-dimensional elements. The role of these functions is to specify the variation of the acoustic field in directions tangent to the terminating surface in step 324 where the terminating surface is congruent with the base facet 67. The variation of the acoustic field in the infinite direction is given by the functions $B_\beta(\xi)$, which are members of a set of polynomials in the infinite-direction coordinate $\xi$ (see below).

The first member of this set of polynomials corresponds to the value of the acoustic pressures on the terminating surface; the other functions are generalized degrees of freedom. Specifically, we choose $$B_1 \equiv 1,$$

$$B_\beta \equiv (1+\xi) G_\beta(\xi), \beta > 1,$$

where $G_\beta(\xi)$ are chosen to be orthogonal with respect to the mass matrix integral (see below). All of the $B_\beta(\xi)$ are equal to zero at the terminating surface, except for $B_f(\xi)$. This ensures that the degrees of freedom on the base facet 67 are defined in step 326 in terms of the first-order terms only.

Mapping

Figure 7:
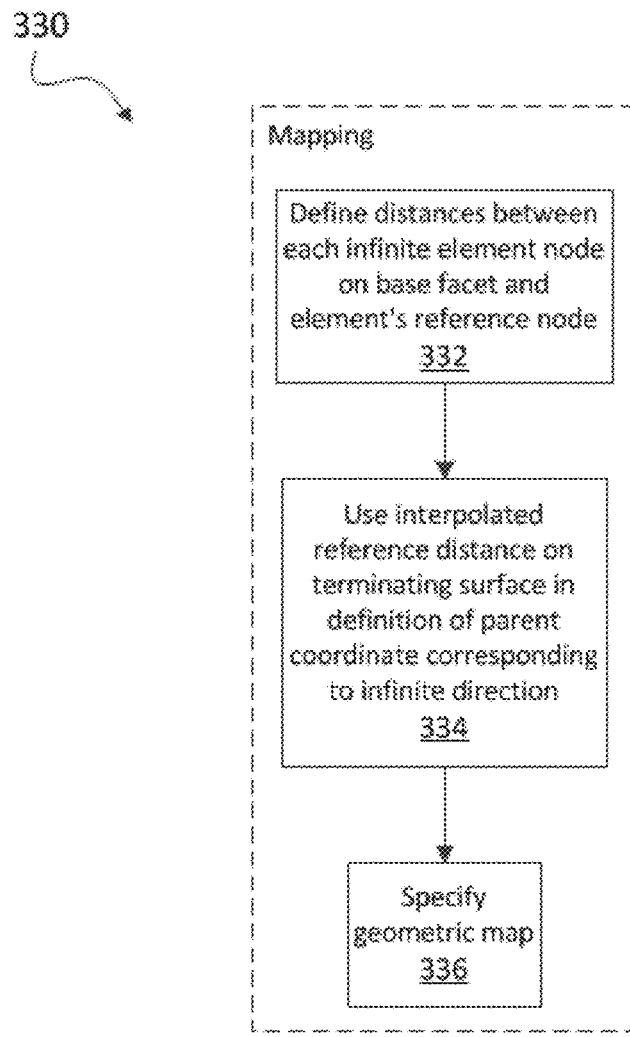
FIG. 7 is a structured flowchart of the processes and components associated with the mapping module of FIG. 4.

Referring now to FIG. 7, the HAED process 300 includes functions and implementation steps to support a mapping module 330. The coordinate map for each model is described in part by the base facet shape functions, in the usual isoparametric manner, and in part by a singular function. Together, the functions map the true, semi-infinite domain onto the parent element square or cube. To specify the map for a given element, we first define in step 332 the distances $r_\alpha$ between each infinite element node a on the base facet 67 and the element's reference node, located at $x_0$:

$$r_\alpha \equiv \|x_\alpha - x_0\|.$$

Intermediate points in the infinite direction are defined as offset replicas of the nodes on the terminating surface:

$$y_\alpha = x_\alpha + r_\alpha n_\alpha,$$

where $n_\alpha$ is the surface normal at the node.

In step 334, we use the interpolated reference distance on the terminating surface, $$r_0(g, h) \equiv \sum_\alpha r_\alpha b_\alpha(g, h),$$

in the definition of the parent coordinate, $\xi$, corresponding to the infinite direction:

$$\xi \equiv 1 - \frac{2 r_0(g, h)}{r},$$

where r is the distance between an arbitrary point in the semi-infinite volume and the reference point, $x_0$. With these definitions, the geometric map can be specified in step 336 as $$x(g, h, \xi) = \sum_\alpha b_\alpha(g, h) \left[ x_\alpha + \left( \frac{\xi+1}{\xi-1} \right) r_\alpha n_\alpha \right].$$

The infinite elements are not isoparametric as such, since the map uses a lower-order function of the parent coordinates than the interpolation scheme does. However, this singular mapping is convenient and invertible.

Derivation

Figure 8:
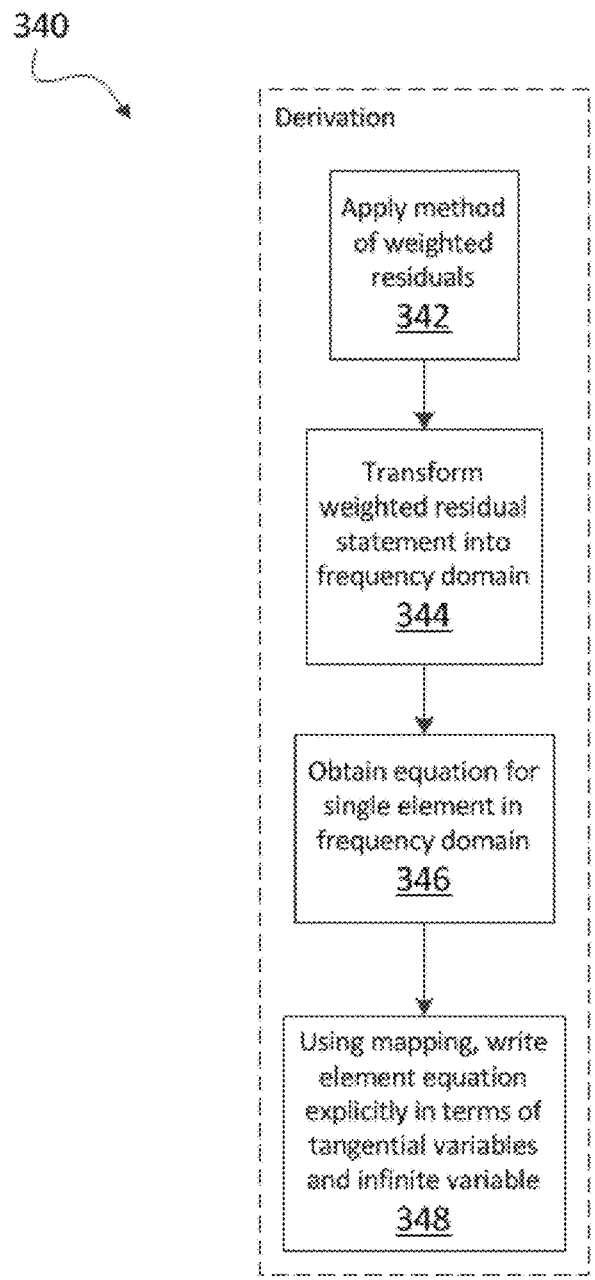
FIG. 8 is a structured flowchart of the processes and components associated with the derivation module of FIG. 4.

Referring now to FIG. 8, the HAED process 300 includes functions and implementations steps to support a derivation module 340. The solution in the unbounded acoustic medium is assumed linear and governed by the same equations as the finite acoustic region:

$$\left( \frac{\partial}{\partial x} \right) \cdot \left[ \frac{1}{\rho} \left( \frac{\partial}{\partial x} \right) p \right] + \frac{\gamma}{K_f \rho} \dot{p} + \frac{1}{K_f} \ddot{p} = 0.$$

The parameter $\gamma$ is used to denote velocity-dependent 'volumetric drag' (material damping/loss) which may exist in the fluid.

Consider the infinite exterior of a region of acoustic fluid bounded by a convex surface and a conventional finite element mesh defined on this surface. Each facet of this surface mesh, together with the normal vectors at the nodes, defines a subdivision of the infinite exterior that will be referred to as the 'infinite element', $V_E$. Application of the method of weighted residuals in step 342 results in a weak form of this equation over the infinite element volume:

$$\int_{V_E} \delta p \left\{ \left( \frac{\partial}{\partial x} \right) \cdot \left[ \frac{1}{\rho} \left( \frac{\partial}{\partial x} \right) p \right] + \frac{\gamma}{K_f \rho} \dot{p} + \frac{1}{K_f} \ddot{p} \right\} dV = 0.$$

This equation is formally identical to that used in the finite element region; however, the choice of functions for the weight, $\delta p$, and for the solution field, p, will be different. To continue with the derivation, we transform the weighted residual statement into the frequency domain in step 344 as follows:

$$\int_{V_E} \delta \tilde{p} \left\{ \left( \frac{\partial}{\partial x} \right) \cdot \left[ \frac{1}{\rho} \left( \frac{\partial}{\partial x} \right) \tilde{p} \right] + \frac{i \omega \gamma}{K_f \rho} \tilde{p} - \frac{\omega^2}{K_f} \tilde{p} \right\} dV = 0.$$

Now the weight and solution interpolation functions are defined as $$\delta \tilde{p} = F \varphi_i(g, h, \xi)$$

$$\tilde{p} = p_j \varphi_j(g, h, \xi)$$

where g(x), h(x), $\xi$(x) are the parent element coordinates, $$k = \omega / c_0,$$

$$c_0^2 = K_f / \rho,$$

$$F = (r_0 / r)^{d-1}$$

$\varphi_j$ are the shape functions, d is the physical dimension (2 or 3), and $p_j$ are element degrees of freedom. The shape functions will be described below. The factor F is the Astley-Leis factor, which ensures integrability for the element terms.

Inserting the shape and weight functions and integrating by parts, we obtain the equation for a single element in the frequency domain in step 346, as follows:

$$\int_{V_E} \left\{ \frac{\partial F \varphi_i}{\partial x} \right\} \cdot \left\{ \frac{1}{\rho} \frac{\partial F \varphi_j}{\partial x} \right\} p_j dV +$$

$$ik \int_{V_E} \frac{\gamma}{\rho \sqrt{K_f \rho}} F \varphi_i \varphi_j dV p_j - k^2 \int_{V_E} \frac{2}{K_f} F \varphi_i \varphi_j dV p_j$$

In step 348, using the mapping defined above, the element equation is written explicitly in terms of the "tangential" variables g and h, and the "infinite" variable $\xi$.

Mass Matrix Construction

Figure 9:
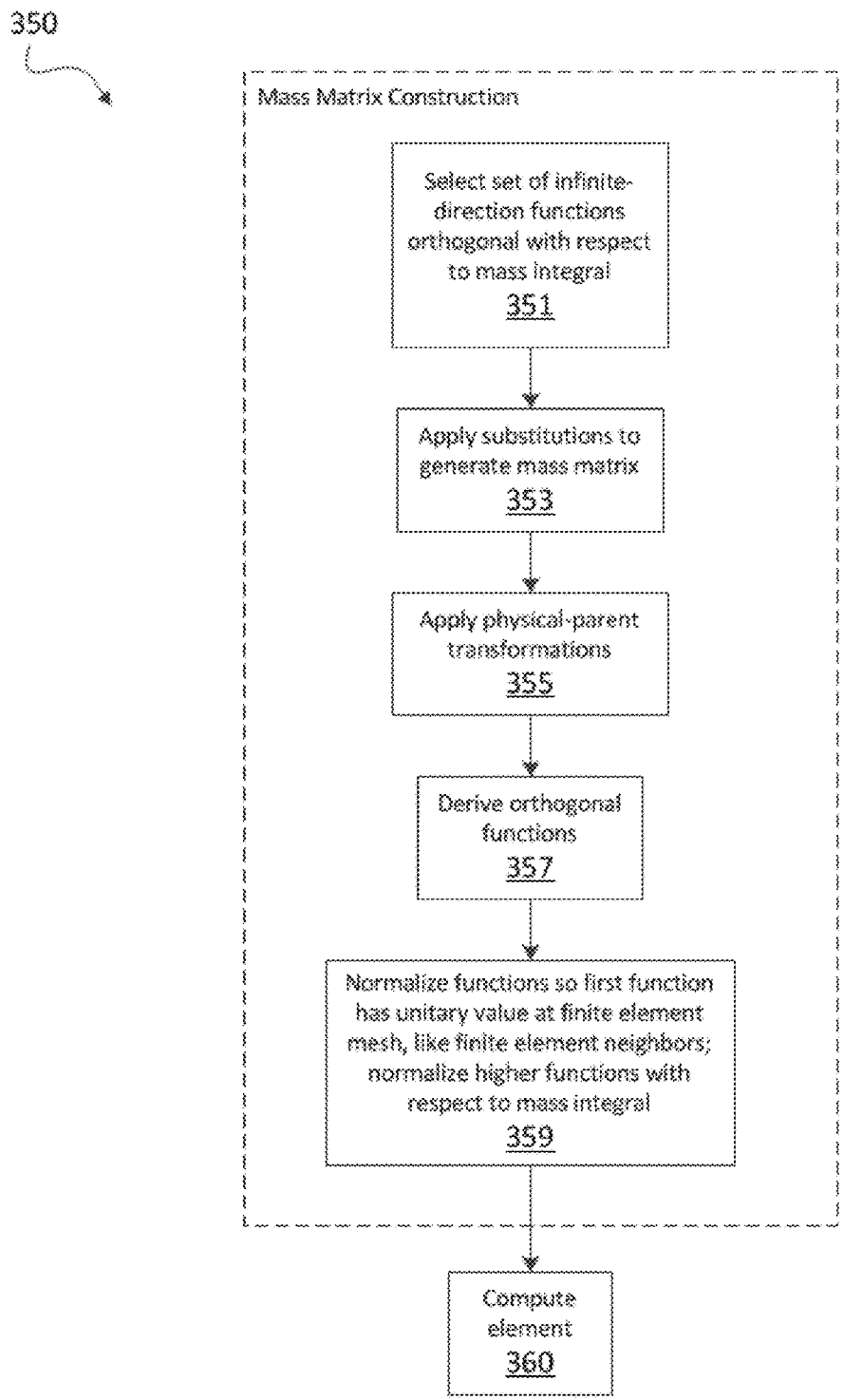
FIG. 9 is a structured flowchart of the processes and components associated with the mass matrix construction and compute element modules of FIG. 4.

Referring now to FIG. 9, the HAED process 300 includes functions and implementations steps to support a mass matrix construction module 350. For explicit finite element applications, a diagonal mass matrix ensures that the algorithm is efficient. Low-order finite element mass matrices are typically "lumped" into diagonal entries. However, the method 100 herein handles the presence of the infinite direction functions differently. Here, in step 351, we select a set of infinite-direction functions in $\xi$, which are orthogonal with respect to the mass integral, so that these contributions are naturally diagonal.

As described above, the element shape and test functions consist of conventional low-order isoparametric finite element functions defined on the base facet 67, multiplied by a set of high-order polynomials in the infinite direction. Consequently, when the appropriate substitutions are made in step 353, the mass matrix consists of terms of the form $$\int_{g,h} b_{\alpha1}(g,h) b_{\alpha2}(g,h) J_{gh}\, dg dh \int_r r_0^{d-1} B_{\beta1}(r)\beta_{\beta2}(r)\left[\left(\frac{r_0}{r}\right)^{\frac{d-1}{2}}\right]^2 \left(\frac{r}{r_0}\right)^{d-1} dr$$

Here, we write using the physical r instead of $\xi$, at the outset; d is the physical dimension (2 or 3). The first part of the integral is akin to a conventional finite element mass matrix in two dimensions, so it may be lumped using standard techniques to obtain an operator diagonal in the indices $\alpha_1$ and $\alpha_2$. The latter term simplifies to $$r_0^{d-1} \int_r B_{\beta1}(r) B_{\beta2}(r)\, dr$$

which, after applying the physical-parent transformations in step 355:

$$r = \frac{2r_0}{1-\xi},$$

$$dr = \frac{2r_0}{(1-\xi)^2},$$

become $$2r_0^d \int_{\xi \in [-1,1]} B_{\beta1}(r) B_{\beta2}(r) \left(\frac{1}{1-\xi}\right)^2 d\xi.$$

In step 357, orthogonal functions are derived. Three functions that are orthogonal with respect to this integral are:

$$B_1(\xi) = 1/2(1-\xi),$$

$$B_2(\xi) = \sqrt{\frac{15}{64}} (1+\xi)(1-\xi)(1-3\xi),$$

$$B_3(\xi) = \sqrt{\frac{35}{192}} (1+\xi)(1-\xi)(1+5\xi-8\xi^2).$$

The $(1-\xi)$ factors are required for integrability. The $(1+\xi)$ factors are included in the higher functions to ensure that the field at the interior face of the element is dependent only on the first function; i.e., that only a single nodal degree of freedom in the element is coupled to the finite element mesh. This coupling avoids having to transform the element's diagonal mass into a non-diagonal form in order to couple to the mesh. More orthogonal functions may be derived if higher-order elements are desired. The functions above are normalized in step 359 so that the first function has unitary value at the finite element mesh, like the finite element neighbors, and the higher functions are normalized with respect to the mass integral.

The corresponding weight functions include the factor F:

$$FB_1(\xi) = 1/2^d (1-\xi)^d,$$

$$FB_2(\xi) = \frac{1}{2^{d-1}} \sqrt{\frac{15}{64}} (1+\xi)(1-\xi)^d (1-3\xi),$$

$$FB_3(\xi) = \frac{1}{2^{d-1}} \sqrt{\frac{35}{192}} (1+\xi)(1-\xi)^d (1+5\xi-8\xi^2).$$

These functions are now in a form that allows the element to be computed conventionally in step 360.

Figure 10A:
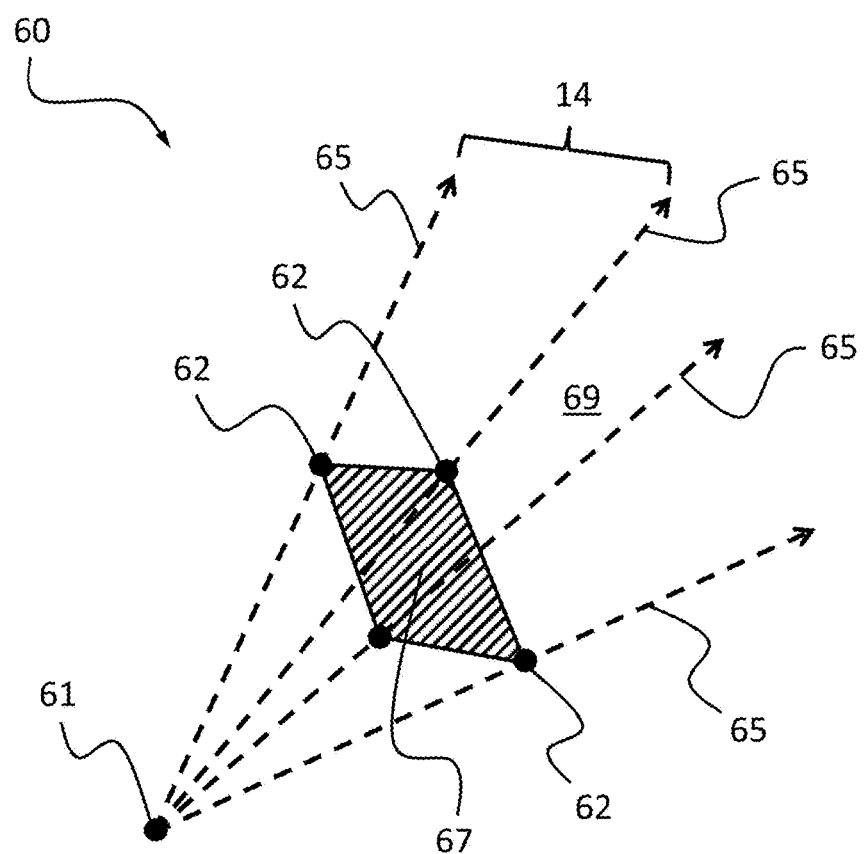
FIG. 10A is an illustration of a three-dimensional view of a quadrilateral hybrid absorbing element, according to a first embodiment of the invention.
Figure 10B:
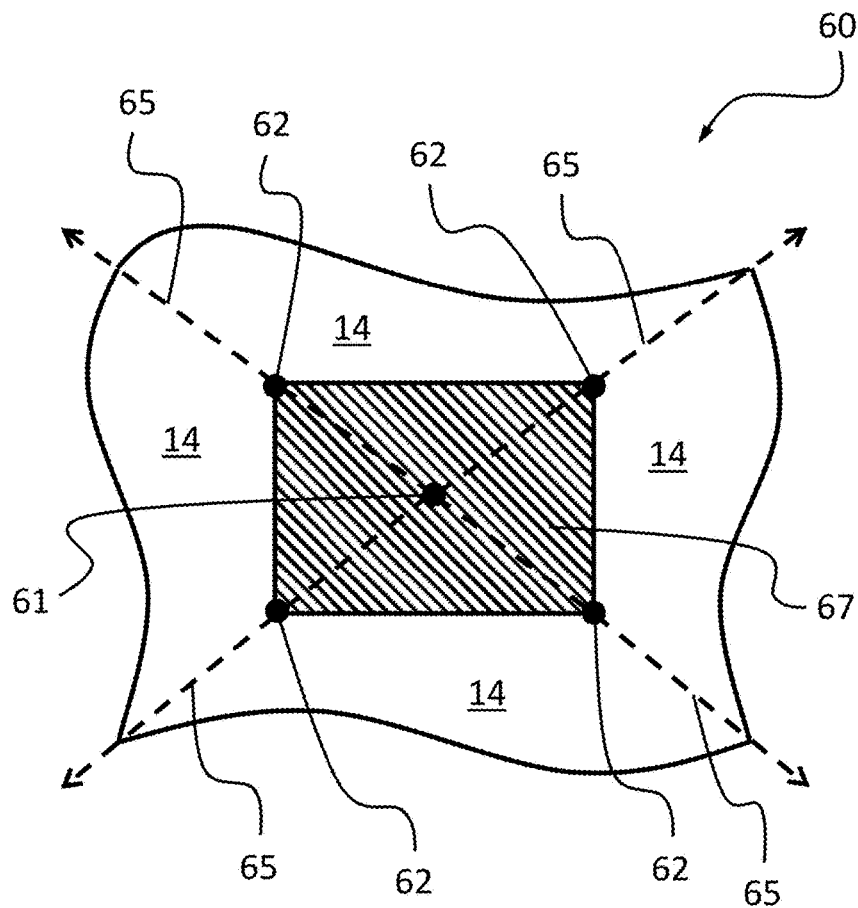
FIG. 10B is an end view of the quadrilateral-shaped hybrid absorbing element of FIG. 10A from an infinite perspective.

For illustrative purposes, in practice and use, referring to FIGS. 10A and 10B, we describe aspects of the use of a quadrilateral hybrid absorbing element 60 wherein the quadrilateral hybrid absorbing element 60 uniquely blends features of the perfectly matched layer (PML) concept with the infinite element concept. Leveraging the quadrilateral hybrid absorbing element 60, the method 100 is able to accurately model wave propagation, absorb short-wavelength waves at all angles of incidence and devolve to a correct low-frequency limit. Devolving to a correct low-frequency limit is typically unachievable using PML alone, since PML are usually implemented using stacks of the usual domain operator (finite elements or finite differences) which terminate at some fixed layer thickness. Such an approach does not work well at very low frequency, because the PML damping is nearly zero, and the underlying code therefore perceives a finite domain size. An infinite element formulation is known to work well at the low frequency limit of acoustics and elasticity.

Combining the infinite element and PML concepts according to method 100 to form the quadrilateral hybrid absorbing element 60 addresses limitations associated with singular use of the two approaches. By creating the quadrilateral hybrid absorbing element 60, the method 100 allows underlying algorithms to be used spatially local to minimize storage and communication requirements and associated costs. It also ensures that second-order time derivatives are compatible with the explicit central difference time integration schema. It also ensures that method 100 converges to the appropriate low-frequency limits.

The method 100 according to the invention is intended to work well in an explicit time-domain finite element code, and hence, the quadrilateral hybrid absorbing element 60 includes a finite (i.e. non-zero) and lump-able (diagonal) mass operator. In the tangential directions, this requirement is satisfied by linear finite element basis functions; in the infinite direction, the basic functions are orthogonalized with respect to the mass integral. In practice, PML formulations require smooth variation of the damping parameter as a function of the infinite direction. Consequently, the method 100 supports inclusion of one or more infinite-direction basis functions. The set of functions contain only one member with nonzero value at the inner "finite" boundary. Using such a member set in the infinite direction, together with linear finite element shape functions in the tangential directions, allows the mass operator of the hybrid absorbing element 60 to be diagonal, ensuring that the coefficients for the second-order derivatives are diagonal for inclusion as a lumped mass.

In modeling associated with finite element techniques, the simpler the elemental structure, the easier it is for a user to configure their desired model using fundamental descriptive elements properly. In the method 100, the quadrilateral hybrid absorbing element 60 may be used according to common practice in infinite elements wherein: the quadrilateral hybrid absorbing element 60 is defined using two nodal layers: an inner node 61 at a finite boundary, and a second base facet 67 defined by nodes 62 whose positions define the infinite-direction rays 65 bounding each quadrilateral hybrid absorbing element 60. The user need only define the inner set of nodes 62, as if the element were a shell or membrane, and define the infinite-direction bounding rays 65 using a single interior point 61 common to all the infinite elements in a member set. The bounding rays 65 are defined from the interior point 61, through each infinite element node 62. This approach ensures that the elements 60 fill the exterior volume. The single interior point 61 may be replaced with a pair of user-defined points, allowing prolate-spheroidal or oblate-spheroidal geometry to be used to define the rays.

Temporal stability and accuracy requirements are driven by the eigenvalues of the hybrid absorbing element 60. The imaginary parts of the eigenvalues lie in the upper half of the complex plane (when the positive sign convention for the Fourier transform is used). This property is tested and designed by applying the proposed element formulation to a spherical exterior, and using Legendre modes in place of finite element tangential discretization. In this manner, the impedance curves of the element formulation, which depend on the PML damping parameter, can be compared to classical results for the sphere across a range of frequencies. The variation of the PML damping parameter in the infinite direction is driven by similar testing and comparison to classical results.

In practice, the number of semi-infinite facets 14 associated with a hybrid absorbing element may vary. In one embodiment, shown in FIGS. 10A and 10B, a quadrilateral hybrid absorbing element 60 comprises four semi-infinite facets 14. In another embodiment, shown in FIGS. 11A and 11B, a triangular hybrid absorbing element 70 comprises three semi-infinite facets 14. Use of other polygons for the base facet is foreseen.

Referring now to FIGS. 10A and 10B, the structure of a hybrid absorbing element 60 having a quadrilateral configuration is described in further detail. The quadrilateral hybrid absorbing element 60 is comprised of a semi-infinite portion 69. The entirety of the quadrilateral hybrid absorbing element 60 is defined by four semi-infinite facets 14 and the base quadrilateral facet 67. The base quadrilateral facet 67 is defined by four nodes 62. Bounding rays 65 extend from the interior origin point 61 and through each of the nodes 62 of the base facet 67, extending to infinity to define the quadrilateral hybrid absorbing element 60.

The quadrilateral hybrid absorbing element 60 blends a perfectly matched layer (PML) model with an infinite element model. Thus configured, the apparatus 20 and method 100 according to the invention supports simultaneous absorption of short-wavelength waves at all angles of incidence while also causing the model to devolve to a correct low-frequency limit. Devolution to a correct low-frequency limit substantially complements PML formulations alone, since PML is implemented using stacks of the domain operator (finite elements or finite differences) which terminate at some fixed layer thickness. PML formulations alone do not work well at very low frequency, because the PML damping is nearly zero at low frequency, and the underlying code will incorrectly perceive a finite domain size.

The quadrilateral hybrid absorbing element 60 is functionally efficient within explicit time-domain finite element code, having a finite (i.e. non-zero) and lumpable mass operator. In the tangential directions, this requirement is satisfied by linear finite element basis functions; in the infinite direction, the basic functions are orthogonalized with respect to the mass integral. The PML formulations preferably include smooth variation of a damping parameter as a function of the infinite direction. Consequently, the apparatus 20 and method 100 driven by application of the quadrilateral hybrid absorbing element 60 provides for application of one or more infinite-direction basis functions. As a matter of convenience, each function contains only one member with nonzero value at the inner finite boundary.

Since modeling of different phenomena and devices can include complex geometry and operational requirements, the apparatus 20 and method 100 leverages the novel features of the quadrilateral hybrid absorbing element 60 applied within the context of various practices associated with infinite elements. The apparatus and method 100 will likewise leverage the novel features of hybrid absorbing elements having different base facet geometries.

Temporal stability and accuracy requirements of the apparatus 20 and method 100 are dependent on the eigenvalues of each quadrilateral hybrid absorbing element 60. The imaginary parts of the eigenvalues lie in the upper half of the complex plane when the positive sign convention for the Fourier transform is used. This requirement is addressed by applying the proposed element formulation to a spherical exterior, and using Legendre modes in place of finite element tangential discretization. In this manner, impedance curves of the hybrid element formulation, which depend on the PML damping parameter, can be compared to classical results for the sphere across a range of frequencies. The variation of the PML damping parameter in the infinite direction is determined with iterative computing analysis to coincide with real-world results and resulting empirical data.

Figure 11A:
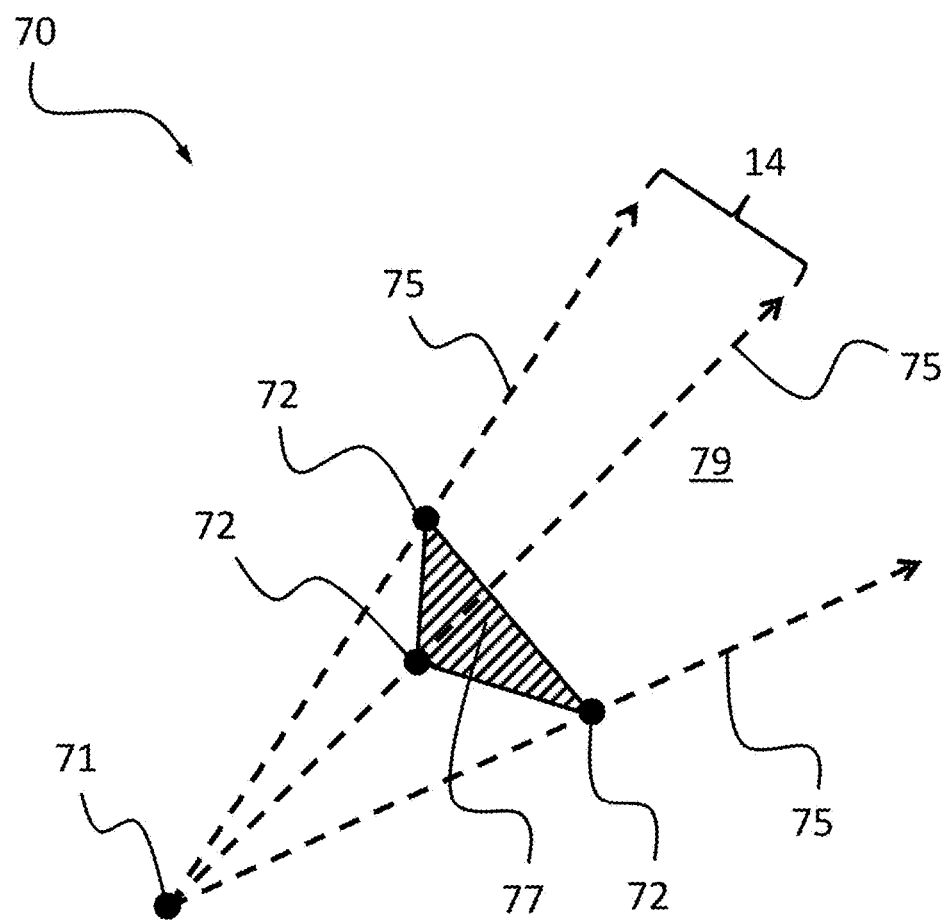
FIG. 11A is an illustration of a three-dimensional view of a triangular-shaped embodiment of the hybrid absorbing element, according to the invention.
Figure 11B:
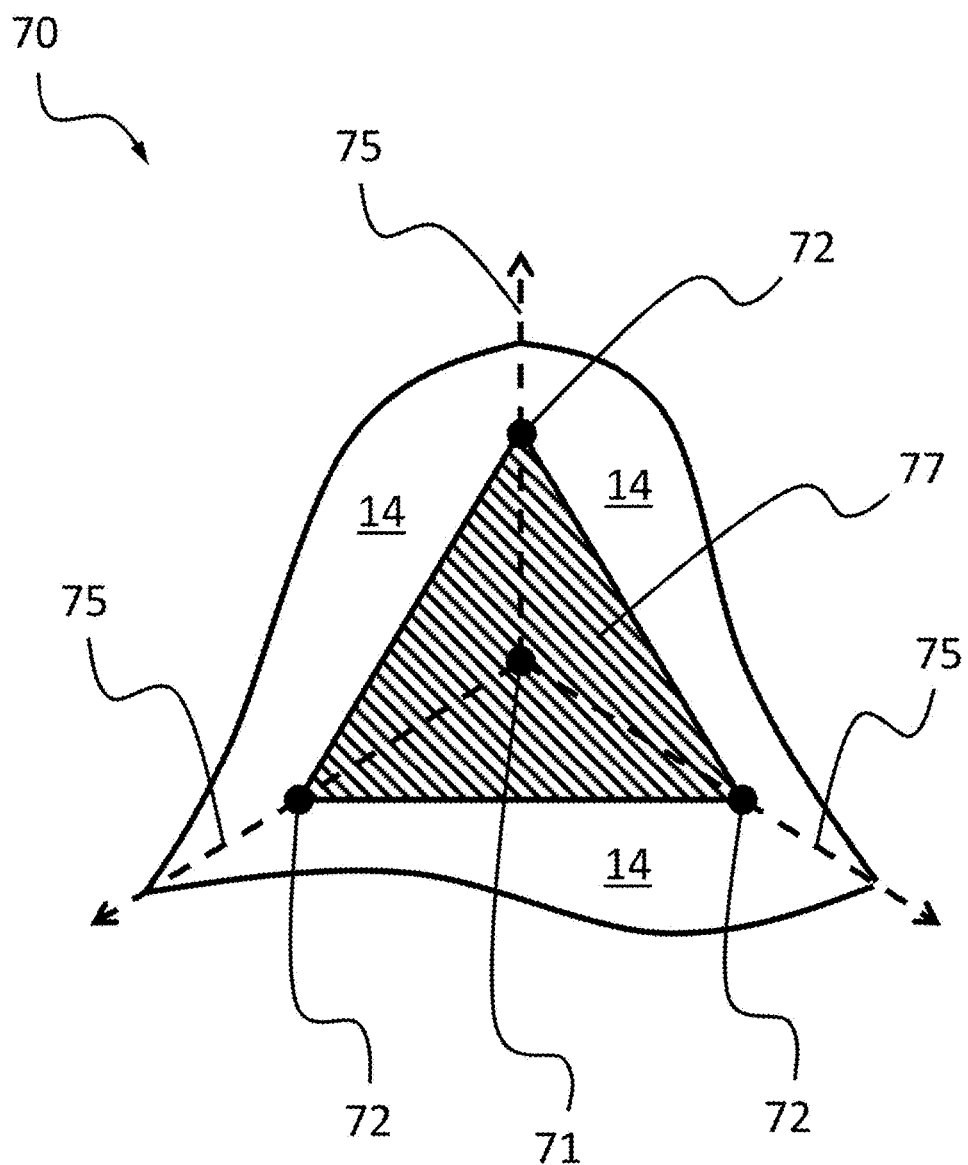
FIG. 11B is an end view of the triangular-shaped hybrid absorbing element of FIG. 11A.

Referring now to FIGS. 11A and 11B, another embodiment of a hybrid absorbing element 70 having a triangular configuration is described. The triangular hybrid absorbing element 70 is comprised of a semi-infinite portion 79. The entirety of the triangular hybrid absorbing element 70 is defined by three semi-infinite facets 14 and the base triangular facet 77. The base triangular facet 77 is defined by three nodes 72. Bounding rays 75 extend from the interior origin point 71 and through each of the nodes 72 of the base facet 77, extending to infinity to define the triangular hybrid absorbing element 70.

Figure 12:
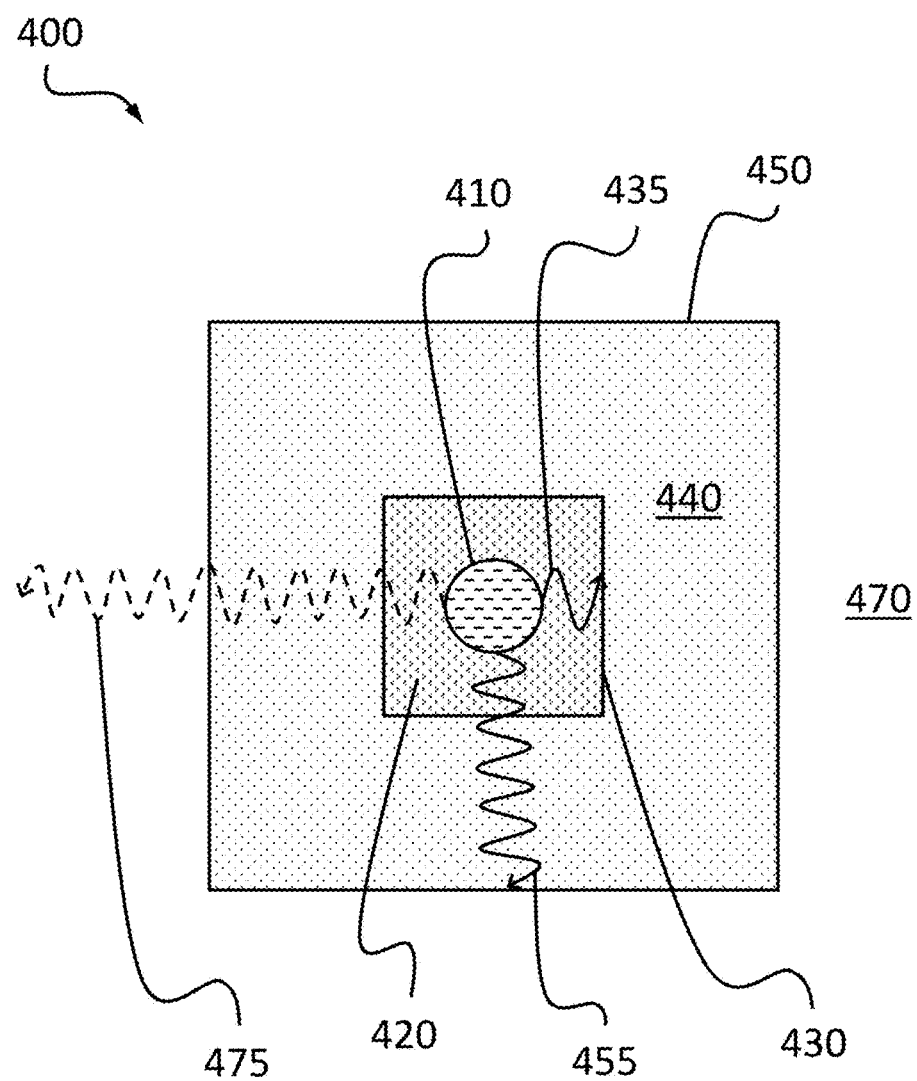
FIG. 12 is a top view of an exemplary diagram of a three-dimensional model including a source.
Figure 13:
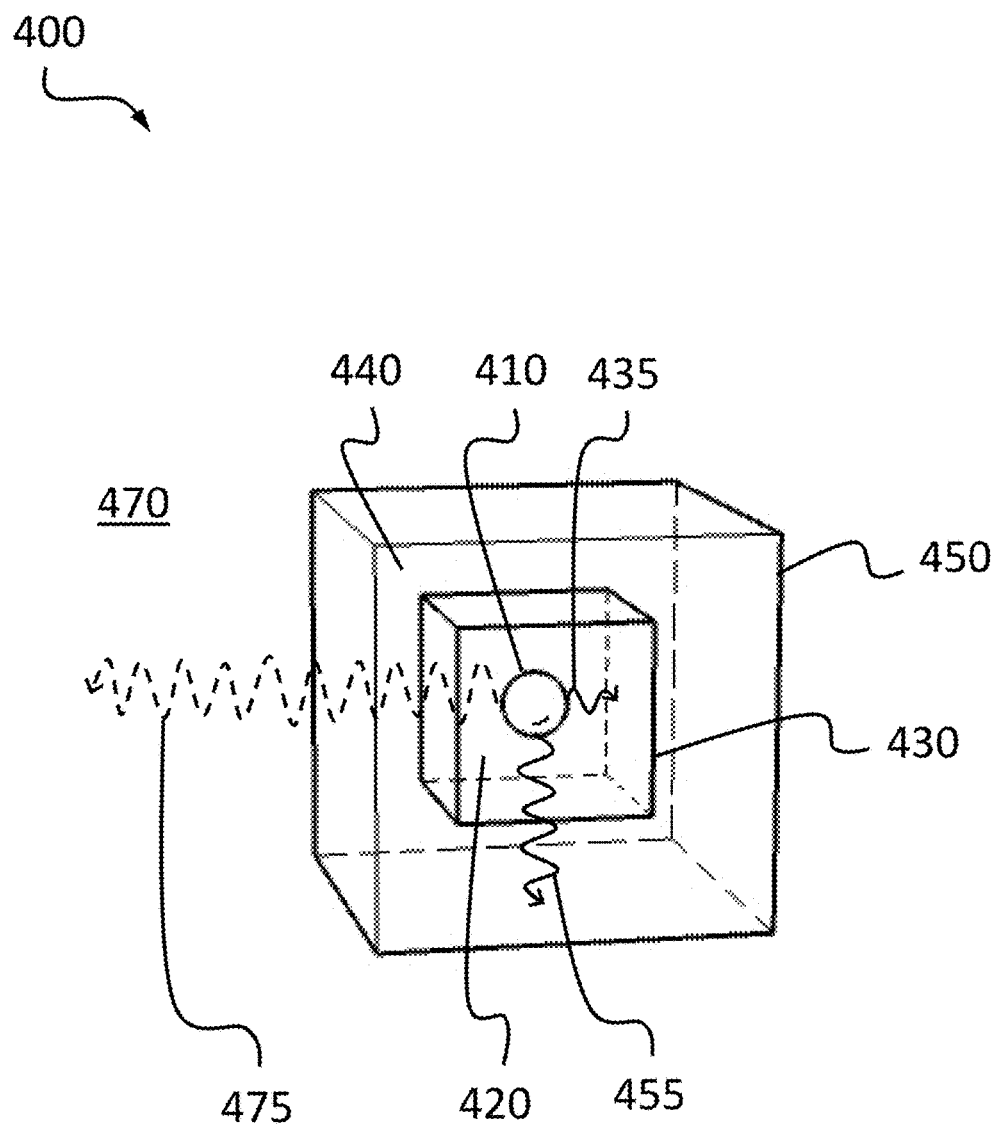
FIG. 13 is a perspective view of the exemplary diagram of the three-dimensional model of FIG. 12.

Now referring to FIG. 12 and FIG. 13, the apparatus 20 and method 100 is implemented on a computer in software or firmware aiding in the pre- and post-processing of finite element models for presentation on a display device. Referring to FIG. 12 in further detail, a top view of a three-dimensional representation 400 is an illustrative schematic of determining the radiation from an acoustic source 410 into an infinite medium 470.

In practice, a simplified finite element model generated by a finite element software program on a computer will generate a viable computer model according to various approximations. For the theoretical unbounded model, which does not lend itself to computational simulation, the acoustic source 410 is surrounded by the infinite medium

470. The acoustic source 410 generates an acoustic wave 475 that propagates throughout the infinite medium 470 until its energy is dissipated and no returns of energy occur. In a first approximation, an absorbing boundary condition 450 is established to truncate the computational model sufficiently to allow the computation and display of results. The absorbing boundary condition 450 is set a distance from the source 410 sufficient to minimize returns from the modeled acoustic wave 455 wherein the size of the computer model extends the distance of the absorbing boundary condition 450. The absorbing boundary condition 450 represents a first approximation of the behavior of a signal 455 emanating from the acoustic source 410. The size of the resulting computing model using conventional methods is driven by the volume 440 within the truncation established by the absorbing boundary condition 450.

According to one embodiment, the computational model required is a function of the hybrid condition 430 established at a distance from the acoustic source 410 to accommodate the distance associated with the wave length 435. Consequently, the required computational model size, driven by the hybrid condition volume 420 is reduced significantly from the conventional implementation using absorbing boundary condition 450 versus that of the apparatus 20 and method 100 of the invention, which uses the hybrid perfectly matched layer 430.

For further clarification and now referring to FIG. 13, a three-dimensional representation of the illustration in FIG. 12 is shown. A three-dimensional acoustic source 410 is represented by a sphere and may be, for example, a tonpilz transducer consisting of an active (piezoelectric or magnorestrictive) material placed between a light, stiff radiating head mass and a heavy tail mass designed to create an unbalanced load in sonar applications. The infinite volume 470 extending beyond the three-dimensional outer border 450 models an acoustic wave 475 propagating through the infinite volume 470. The three-dimensional model 400 includes an absorbing boundary condition represented by the surface 450, which establishes the size of the computational model associated with a conventional method of finite element analysis using only the absorbing boundary condition 450 for truncation of the model at a distance established by requirements for the acoustic signal wave 455.

For exemplary purposes, a typical model may consist of approximately twenty million elements whose interactions and signal propagations must be computed. In an embodiment of the apparatus 20 and method 100, a further approach for truncating the computational model comprises a hybrid absorbing boundary condition that establishes the outer surface 430 penetrated by an acoustic wave 435, which is efficiently absorbed at the outer surface 430 to minimize returns. The number of elements required by the model according to an embodiment of the invention is significantly reduced to approximately one million elements, saving significant compute time and compute resources after application of one embodiment of the apparatus 20 and method 100 described herein.

Figure 14:
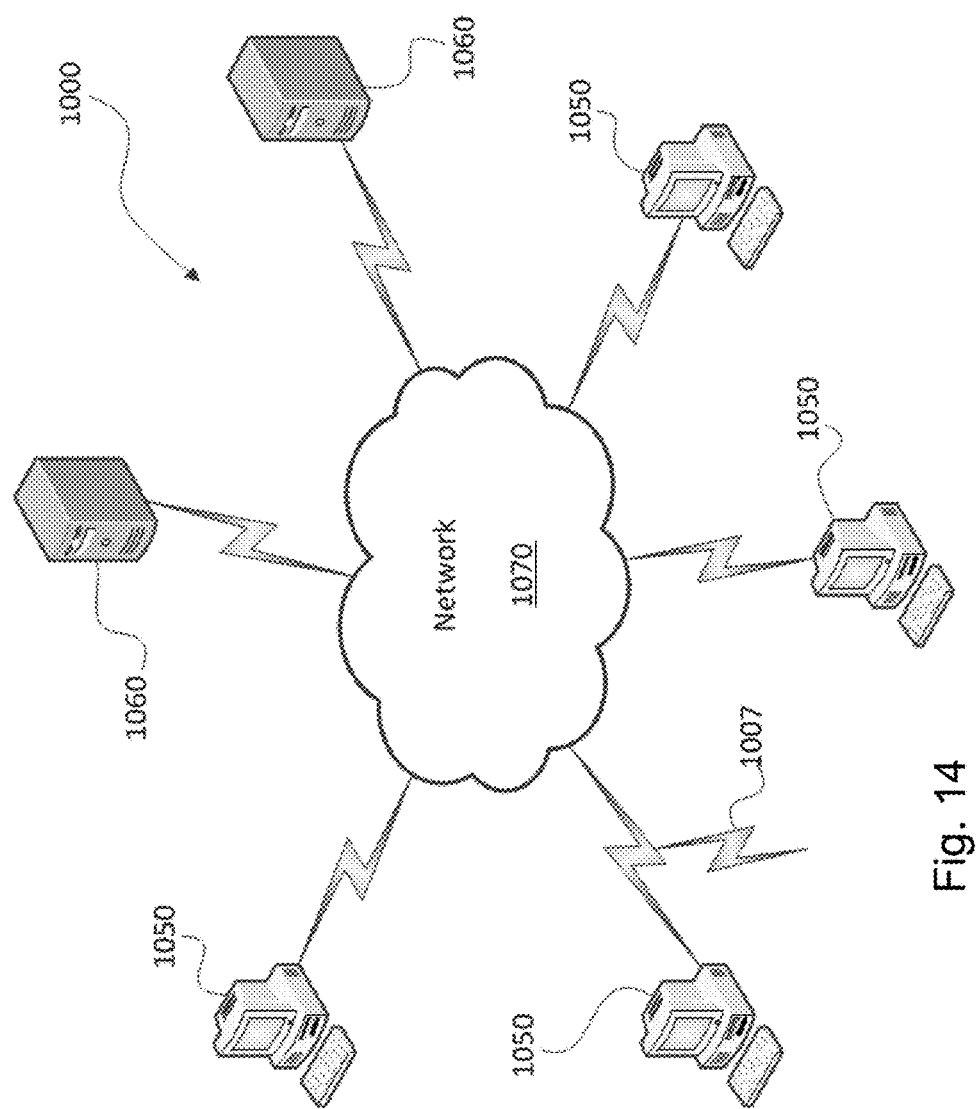
FIG. 14 is an illustrative diagram of various compute components deployed across a network associated with embodiments of the apparatus.

Now referring to FIG. 14, the apparatus 20 and method 100 is implemented across a global network, generally supported by the Internet and the World Wide Web. FIG. 14 illustrates a computer network or similar digital processing environment 1000 in which the apparatus 20 and method 100 may be implemented. Client computer(s)/devices 1050 and server computer(s) 1060 provide processing, storage, and input/output devices executing application programs and the like. Client computer(s)/devices 1050 can also be linked through communications network 1070 to other computing devices, including other client devices/processes 1050 and server computer(s) 1060. Communications network 1070 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 15:
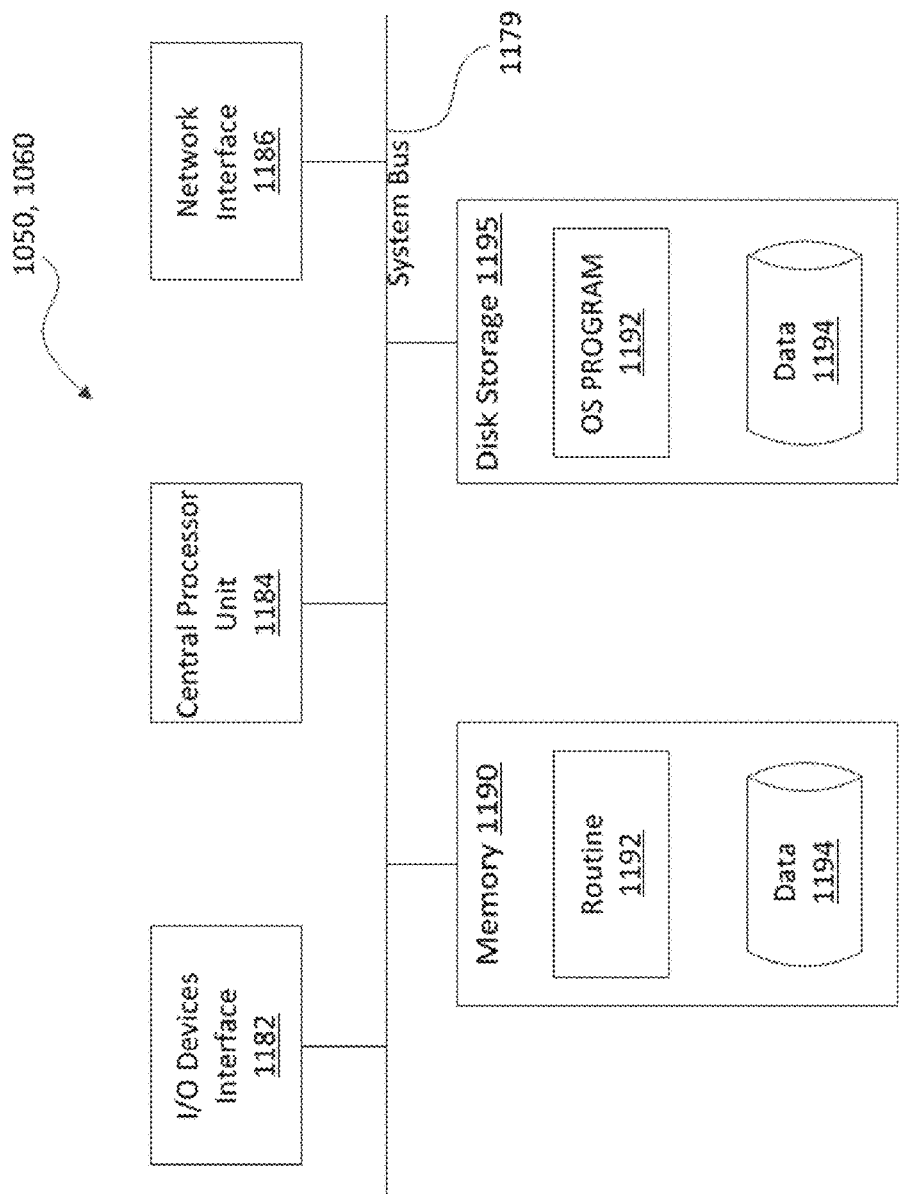
FIG. 15 is a structural schematic of various components associated with computing elements of the apparatus.

FIG. 15 is a diagram of the internal structure of a representative computer (e.g., client processor/device 1050 or server computers 1060) in the computer system of FIG. 14. Each computer 1050, 1060 contains system bus 1179, where a bus is a set of hardware lines used for data transfer among the components of a computer or processing system. Bus 1179 is essentially a shared conduit that connects different elements of a computer system (e.g., processor, disk storage, memory, input/output ports, network ports, etc.) that enables the transfer of information between the elements. Attached to system bus 1179 is an Input/Output (I/O) device interface 1182 for connecting various input and output devices (e.g., keyboard, mouse, displays, printers, speakers, etc.) to the computer 1050, 1060. Network interface 1186 allows the computer to connect to various other devices attached to a network (e.g., network 1070 of FIG. 11). Memory 1190 provides volatile storage for computer software instructions 1192 and data 1194 used to implement an embodiment (e.g., object models, codec and object model library discussed above). Disk storage 1195 provides non-volatile storage for computer software instructions 1192 and data 1194 used to implement an embodiment. Central processor unit 1184 is attached to system bus 1179. Central processor unit 1184 provides for the execution of computer instructions.

In one aspect, the processor routines 1192 and data 1194 are a computer program product, including a computer readable medium (e.g., a removable storage medium, such as one or more DVD-ROMs, CD-ROMs, diskettes, tapes, hard drives, etc.) that provides at least a portion of the software instructions for the apparatus 20 and method 100. Computer program product can be installed by any suitable software installation procedure, as is well known in the art. In another embodiment, at least a portion of the software instructions may also be downloaded over a cable, communication and/or wireless connection. In other embodiments, the apparatus 20 and method 100 programs are a computer program propagated signal product embodied on a propagated signal on a propagation medium 1007 (e.g., a radio wave, an infrared wave, a laser wave, a sound wave, or an electrical wave propagated over a global network, such as the Internet, or other network(s)). Such carrier medium or signals provide at least a portion of the software instructions for the routines/program 1192.

In alternate aspects, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a certain time period, such as the instructions for a software application sent in packets over a network over a period of milliseconds, seconds, minutes, or longer. In another embodiment, the computer readable medium of computer program product is a propagation medium that the computer system may receive and read, such as by receiving the propagation medium and identifying a propagated signal embodied in the propagation medium, as described above for computer program propagated signal product. The term "carrier medium" or transient carrier encompasses the foregoing transient signals, propagated signals, propagated medium, storage medium and the like.

Aspects of the invention have been particularly shown and described with respect to certain preferred embodiments and features thereof. However, it should be readily apparent to those of ordinary skill in the art that various changes and modifications in form and detail may be made without departing from the spirit and scope of the inventions as set forth in the appended claims.

For example, the apparatus 20 and method 100 may be implemented in a variety of computer architectures. The computer network of FIG. 14 and compute elements of FIG. 15 are for purposes of illustration and not limitation of the inventive subject matter.

As contemplated herein, various aspects and embodiments of the inventive subject matter can take the form of an entirely hardware embodiment, an entirely software embodiment or an embodiment containing both hardware and software elements. In one embodiment, the inventive subject matter is implemented in software, which includes but is not limited to firmware, resident software, microcode, and other forms.

Furthermore, embodiments of the inventive subject matter can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Some examples of optical disks include compact disc-read only memory (CD-ROM), compact disc read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories, which provide temporary storage of at least some program code in order to reduce the number of times code are retrieved from bulk storage during execution.

Input/output or I/O devices (including but not limited to keyboards, displays, pointing devices, etc.) can be coupled to the apparatus 20 either directly or through intervening I/O controllers.

Network adapters may also be coupled to the apparatus 20 to enable the data processing system to become coupled to other data processing systems or remote printers or storage devices through intervening private or public networks. Modems, cable modem and Ethernet cards are just a few of the currently available types of network adapters.

Thus, specific compositions and methods of the computer-implemented apparatus 20 and method 100 have been disclosed. It should be apparent, however, to those skilled in the art that many more modifications besides those already described are possible without departing from the inventive concepts herein. The inventive subject matter, therefore, is not to be restricted except in the spirit of the disclosure. Moreover, in interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

I claim:

1. A computer-implemented method for reducing a size of computational domain for modeling infinite exteriors for wave field phenomena associated with a body within a spatial region wherein said body is subjected to derived conditions, the method comprising:
   a. a pre-processing phase, wherein a mesh is generated by a processor, and problem data are specified;
   b. a solution phase comprising the steps of:
      i. deriving element equations;
      ii. deriving hybrid absorbing element equations, by defining a geometry of a hybrid absorbing element, wherein said geometry includes:
         a base facet;
         rays emanating, from said base facet;
         three or more semi-infinite facets; and
         a semi-infinite volume of said hybrid absorbing element;
      iii. evaluating coefficients in said, element equations using the derived element equations and the derived hybrid absorbing element equations;
      iv. assembling said element equations to form a global system of equations;
      v. adding load and boundary conditions to said global system of equations; and
      vi. solving said global system of equations; and
   c. a post-processing phase wherein computed data is displayed to a user interface of a display device.

2. The method of claim 1, wherein said step for deriving said hybrid absorbing element equations further includes the following steps:
   a. defining a decay function;
   b. defining a mapping of the hybrid absorbing element;
   c. deriving associated algorithms and functions associated with the definition of the hybrid absorbing element;
   d. constructing a mass matrix; and
   e. computing said hybrid absorbing element.

3. The method of claim 2, wherein said step of defining said decay function includes the additional steps of:
   a. defining hybrid element shape functions;
   b. using said hybrid element shape functions to specify variation of the wave field in directions tangent to a terminating surface; and
   c. defining degrees of freedom on said base facet.

4. The method of claim 2, wherein said mapping step includes the steps of:
   a. defining distances between element nodes on said base facet and a reference node of said hybrid absorbing element;
   b. using an interpolated reference distance on a terminating, surface as a parent coordinate associated with infinite direction; and
   c. specifying a geometric map.

5. The method of claim 2, wherein said deriving hybrid absorbing element equations step further includes the steps of:

a. applying a weighted residuals method to create a weighted residual statement;
b. transforming said weighted residual statement into a frequency domain;
c. obtaining an equation for a single element in the frequency domain; and
d. using mapping, writing an element equation explicitly in terms of tangential variables and infinite variables.

6. The method of claim 2, wherein said mass matrix construction step includes the additional steps of:
a. selecting a set infinite direction functions, said set being orthogonal with respect to a mass integral;
b. applying substitutions to generate said mass matrix;
c. applying physical parent transformations;
d. deriving orthogonal functions;
e. normalizing said functions such that a first function has a unitary value at a finite element mesh; and
f. normalizing higher functions with respect to said mass integral.

7. The method of claim 1, further comprising: generating numerical values for the evaluated coefficients and storing said numerical values in an electronic memory.

* * * * *